(12) United States Patent
Luo et al.

(10) Patent No.: US 9,277,540 B2
(45) Date of Patent: Mar. 1, 2016

(54) SYSTEM, APPARATUS AND METHOD FOR CONTROL CHANNEL CONFIGURATION IN WIRELESS COMMUNICATION SYSTEMS

(75) Inventors: Tao Luo, San Diego, CA (US); Juan Montojo, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 63 days.

(21) Appl. No.: 13/105,642

(22) Filed: May 11, 2011

(65) Prior Publication Data

US 2011/0280201 A1  Nov. 17, 2011

Related U.S. Application Data

(60) Provisional application No. 61/334,141, filed on May 12, 2010, provisional application No. 61/345,006, filed on May 14, 2010.

(51) Int. Cl.
*H04W 72/04* (2009.01)
*H04L 5/00* (2006.01)

(52) U.S. Cl.
CPC ......... *H04W 72/0406* (2013.01); *H04L 5/0094* (2013.01); *H04L 5/0048* (2013.01); *H04L 5/0053* (2013.01)

(58) Field of Classification Search
USPC .......................................................... 370/329
See application file for complete search history.

(56) References Cited

U.S. PATENT DOCUMENTS

| 2007/0133458 | A1* | 6/2007 | Chandra et al. ................ 370/329 |
| 2008/0159323 | A1* | 7/2008 | Rinne et al. ................... 370/431 |
| 2009/0003486 | A1* | 1/2009 | Kwon et al. ................... 375/299 |
| 2009/0257449 | A1  | 10/2009 | Chen et al. |

(Continued)

FOREIGN PATENT DOCUMENTS

| CN | 101611652 A | 12/2009 |
| EP | 2352242 A1  | 8/2011  |

(Continued)

OTHER PUBLICATIONS

International Search Report and Written Opinion—PCT/US2011/036322—ISA/EPO—Sep. 29, 2011.

(Continued)

*Primary Examiner* — Sulaiman Nooristany
(74) *Attorney, Agent, or Firm* — Ke Liu

(57) ABSTRACT

In accordance with aspects of the disclosure, a method, apparatus, and computer program product are provided for wireless communication. The method, apparatus, and computer program product, in an implementation, may be configured to provide separate control channels for each of downlink grant information and uplink grant information, encode the control channels with an identifier known only to receiving nodes that are configured to decode the control channels with the identifier, and convey information to the receiving nodes that the identifier is known to the receiving nodes. The method, apparatus, and computer program product, in an implementation, may be configured to determine an aggregation level of a common search space related to common control resources, wherein the aggregation level is less than four, and receive control data from one or more candidates in the common search space that include contiguous control channel elements according to the aggregation level.

6 Claims, 17 Drawing Sheets

(56) References Cited

U.S. PATENT DOCUMENTS

| | | |
|---|---|---|
| 2010/0009634 A1 | 1/2010 | Budianu et al. |
| 2010/0260036 A1* | 10/2010 | Molnar et al. ................ 370/203 |
| 2011/0194412 A1 | 8/2011 | Park et al. |
| 2011/0194525 A1 | 8/2011 | Nishio et al. |
| 2011/0200004 A1 | 8/2011 | Nakashima et al. |
| 2011/0243059 A1* | 10/2011 | Liu et al. ....................... 370/315 |
| 2011/0268032 A1 | 11/2011 | Kim et al. |

FOREIGN PATENT DOCUMENTS

| | | |
|---|---|---|
| JP | 2010515389 A | 5/2010 |
| JP | 2011508511 A | 3/2011 |
| JP | 2012503922 A | 2/2012 |
| KR | 20090108061 A | 10/2009 |
| WO | WO-2008081004 A1 | 7/2008 |
| WO | 2009087742 A1 | 7/2009 |
| WO | WO-2009082333 A1 | 7/2009 |
| WO | WO-2010005639 A2 | 1/2010 |
| WO | 2010016996 A1 | 2/2010 |
| WO | WO-2010039003 A2 | 4/2010 |
| WO | 2010050754 A2 | 5/2010 |
| WO | WO-2010050105 A1 | 5/2010 |
| WO | WO-2010050234 A1 | 5/2010 |

OTHER PUBLICATIONS

Catt, "Multiplexing of R-PDCCH and R-PDSCH", 3GPP TSG RAN WG1 meeting #61, R1-102665, May 10, 2010, pp. 1-4.

Ericsson, "PDCCH blind decoding—Outcome of offline discussions", 3GPP TSG RAN WG1 Meeting #52, R1-081101, Feb. 11-15, 2008, 7 Pages.

Ericsson, "Summary of email discussion on DL control signaling", TSG-RAN WG1 #52bis, R1-081522, Mar. 31-Apr. 4, 2008, 7 Pages.

Mitsubishi Electric: Blind detection complexity reduction with UE specific PDCCH scrambling 3GPP Draft; R1-080405, 3rd Generation Partnership Project (3GPP), Mobile Competence Centre ; 650, Route Des Lucioles ; F-06921 Sophia-Antipolis Cedex ; France, vol. RAN WG1, no Sevilla, Spain; 20080109, Jan. 9, 2008, 8 Pages, XP050108924 [retrieved on Jan. 9, 2008] the whole document.

Motorola, "PDCCH Search Space Assignment Hashing Function," 3GPP TSG RAN1 #52bis, R1-081289, Shenzhen, China, Mar. 31-Apr. 4, 2008, 4 Pages.

* cited by examiner

SYSTEM, APPARATUS AND METHOD FOR CONTROL CHANNEL CONFIGURATION IN WIRELESS COMMUNICATION SYSTEMS

CROSS-REFERENCE TO RELATED APPLICATION(S)

This application claims priority to and the benefit of U.S. Provisional Patent Application Ser. No. 61/334,141, entitled "Systems and Apparatus for Control Channel Design in Data Regions," filed on May 12, 2010 and U.S. Provisional Patent Application Ser. No. 61/345,006, entitled "Common Search Space Design for LTE-A," filed on May 14, 2010, which are expressly incorporated by reference herein in their entirety.

BACKGROUND

1. Field

The present disclosure relates generally to communication systems, and more particularly, to control channel configuration in wireless communication systems.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, time division synchronous code division multiple access (TD-SCDMA) systems, and worldwide interoperability for microwave access (WiMAX).

For wireless communication systems, these multiple-access technologies have been adopted in various telecommunication standards to provide a common protocol that enables different wireless devices to communicate on a municipal, national, regional, and even global level. An example of an emerging telecommunication standard is Long Term Evolution (LTE). LTE provides a set of enhancements to the Universal Mobile Telecommunications System (UMTS) mobile standard promulgated by Third Generation Partnership Project (3GPP). LTE is designed to better support mobile broadband Internet access by improving spectral efficiency, lower costs, improve services, make use of new spectrum, and better integrate with other open standards utilizing OFDMA on the downlink (DL), SC-FDMA on the uplink (UL), and multiple-input multiple-output (MIMO) antenna technology.

However, as the demand for mobile broadband access continues to increase, there exists a need for further improvements in LTE technology. Preferably, these improvements should be applicable to other multi-access technologies and the telecommunication standards that employ these technologies.

SUMMARY

In accordance with aspects of the disclosure, a method for wireless communication comprises providing separate control channels for each of downlink grant information and uplink grant information, encoding the control channels with an identifier known only to receiving nodes that are configured to decode the control channels with the identifier, and conveying information to the receiving nodes that the identifier is known to the receiving nodes.

In accordance with aspects of the disclosure, an apparatus for wireless communication comprises a processing system configured to provide separate control channels for each of downlink grant information and uplink grant information, encode the control channels with an identifier known only to receiving nodes that are configured to decode the control channels with the identifier, and convey information to the receiving nodes that the identifier is known to the receiving nodes.

In accordance with aspects of the disclosure, an apparatus for wireless communication comprises a means for providing separate control channels for each of downlink grant information and uplink grant information, a means for encoding the control channels with an identifier known only to receiving nodes that are configured to decode the control channels with the identifier, and a means for conveying information to the receiving nodes that the identifier is known to the receiving nodes.

In accordance with aspects of the disclosure, a computer program product comprises a computer-readable medium comprising codes executable to cause an apparatus to provide separate control channels for each of downlink grant information and uplink grant information, encode the control channels with an identifier known only to receiving nodes that are configured to decode the control channels with the identifier, and convey information to the receiving nodes that the identifier is known to the receiving nodes.

In accordance with aspects of the disclosure, a method for wireless communication comprises receiving separate control channels for each of downlink grant information and uplink grant information, decoding the control channels with a known identifier, and determining the span of the control channels via blind hypothesis testing for one or more span configurations of the control channels.

In accordance with aspects of the disclosure, an apparatus for wireless communication comprises a processing system configured to receive separate control channels for each of downlink grant information and uplink grant information, decode the control channels with a known identifier, and determine the span of the control channels via blind hypothesis testing for one or more span configurations of the control channels.

In accordance with aspects of the disclosure, an apparatus for wireless communication comprises a means for receiving separate control channels for each of downlink grant information and uplink grant information, a means for decoding the control channels with a known identifier, and a means for determining the span of the control channels via blind hypothesis testing for one or more span configurations of the control channels.

In accordance with aspects of the disclosure, a computer program product comprises a computer-readable medium comprising codes executable to cause an apparatus to receive separate control channels for each of downlink grant information and uplink grant information, decode the control channels with a known identifier, and determine the span of the control channels via blind hypothesis testing for one or more span configurations of the control channels.

In accordance with aspects of the disclosure, a method for wireless communication comprises determining an aggregation level of a common search space related to common control resources, wherein the aggregation level is less than four, and receiving control data from one or more candidates in the common search space that include contiguous control channel elements according to the aggregation level.

In accordance with aspects of the disclosure, an apparatus for wireless communication comprises a processing system configured to determine an aggregation level of a common search space related to common control resources, wherein the aggregation level is less than four, and receive control data from one or more candidates in the common search space that include contiguous control channel elements according to the aggregation level.

In accordance with aspects of the disclosure, an apparatus for wireless communication comprises a means for determining an aggregation level of a common search space related to common control resources, wherein the aggregation level is less than four, and a means for receiving control data from one or more candidates in the common search space that include contiguous control channel elements according to the aggregation level.

In accordance with aspects of the disclosure, a computer program product comprises a computer-readable medium comprising codes executable to cause an apparatus to determine an aggregation level of a common search space related to common control resources, wherein the aggregation level is less than four, and receive control data from one or more candidates in the common search space that include contiguous control channel elements according to the aggregation level.

BRIEF DESCRIPTION OF THE DRAWINGS

The features, nature, and advantages of the disclosure will become more apparent from the detailed description set forth below when taken in conjunction with the drawings in which like reference characters identify correspondingly throughout.

DETAILED DESCRIPTION

Figure 1A:
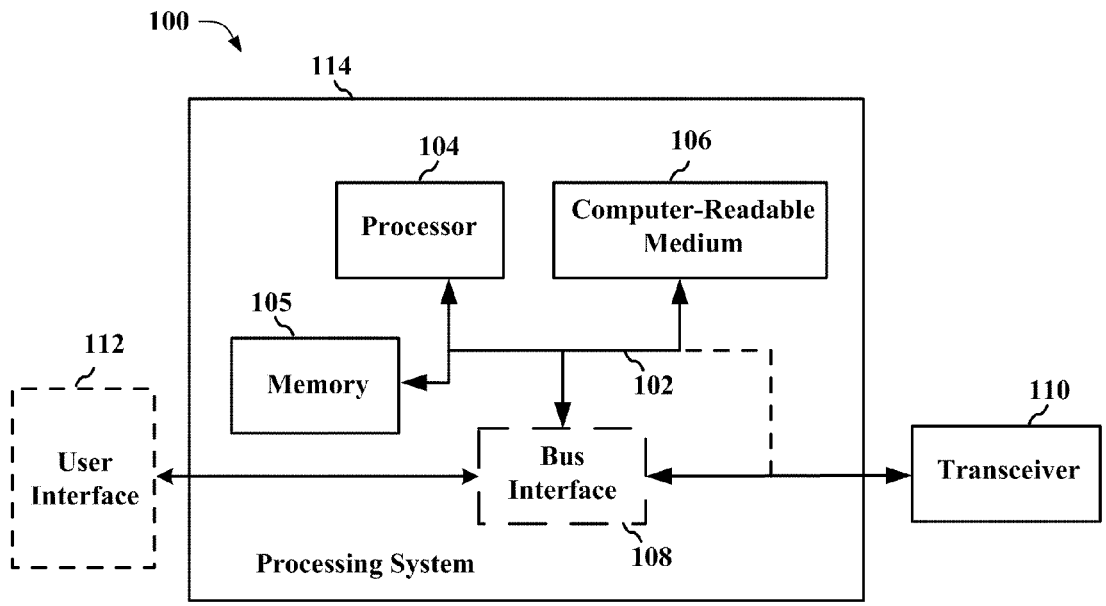
FIGS. 1A and 1B are diagrams illustrating examples of hardware implementations for an apparatus employing a processing system, in accordance with aspects of the disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

In accordance with the disclosure, several aspects of telecommunication systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented utilizing electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

The techniques described herein may be utilized for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc.

The terms "networks" and "systems" are often utilized interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS, and LTE are described in documents from an organization named "3rd Generation Partnership Project" (3GPP). CDMA2000 is described in documents from an organization named "3rd Generation Partnership Project 2" (3GPP2). These various radio technologies and standards are known in the art. For clarity, certain aspects of the techniques are described below for LTE, and LTE terminology is utilized in much of the description below.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

In an aspect of the disclosure, a wireless multiple-access communication system is configured to simultaneously support communication for multiple wireless terminals. Each terminal communicates with one or more base stations via transmissions on the forward and reverse links. The forward link or downlink (DL) refers to the communication link from the base stations to the terminals, and the reverse link or uplink (UL) refers to the communication link from the terminals to the base stations. This communication link may be established via a single-in-single-out, multiple-in-single-out, or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min \{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system supports a time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

As described herein, in a 3GPP system, to communicate a control channel in the data region for a relay node (RN), DL grants are transmitted in a first slot of a subframe. If the DL grant is transmitted in a first Physical Resource Block (PRB) of a given PRB pair, then a UL grant may be transmitted in a second PRB of the PRB pair. For cases employing DeModulation Reference Signals (DM-RS), the DL grant and UL grant in a PRB pair is for the same RN. In these embodiments, no Resource Elements (REs) in the PRB pair may be used for a different RN. For cases employing a Common Reference Signal (CRS), the DL grant and UL grant in the PRB pair may be for the same or for different RNs. In these embodiments, the details of transmission of the DL grant alone or the UL grant alone may be determined. Accordingly, systems and apparatuses providing control channel design in the data region may be provided for LTE-Advanced (LTE-A) and other wireless communication systems.

In an implementation, base stations may be configured to communicate control data to wireless terminals (and/or vice versa) over logical control channel resources, which may be defined as a portion of frequency over time. For instance, in LTE, the control channel resources may comprise a number of orthogonal frequency division multiplexing (OFDM) symbols starting at the beginning of a subframe. The OFDM symbols may be contiguous or noncontiguous portions of frequency over time. In an example, a subframe may comprise a fixed number of OFDM symbols. In addition, at least a portion of the control channel resources may be common among wireless terminals such that a wireless terminal may need to search the control channel resources to locate control data related to the wireless terminal.

To lessen the burden of searching a number of control channel resources at the wireless terminal, base stations may be configured to define a common search space and an aggregation level in the common search space that may comprise control data related to a given wireless terminal. For instance, in a common search space including, for example, 16 control channel elements (CCE), as defined in LTE release 8, an aggregation level of 8 leaves only two candidates that may include control data for a given wireless terminal. Therefore, instead of searching all 16 CCEs in the common search space, a wireless terminal may need to only analyze the 2 candidates to determine whether the candidates include control data related to the wireless terminal for aggregation level 8. However, in LTE release 8, only aggregation levels 8 and 4 are defined for the common search space.

FIG. 1A is a diagram illustrating an embodiment of an apparatus 100 employing a processing system 114 and a memory 105, in accordance with aspects of the disclosure. The apparatus 100 is configured to operate as a node (e.g., a wireless device, such as an access point, base station, relay, access terminal, user equipment, etc.) in a wireless communication network and communicate with other nodes in the wireless communication network.

In an aspect of the apparatus 100, the processing system 114 may be implemented with a bus architecture, represented by a bus 102. The bus 102 may include any number of interconnecting buses and bridges depending on the specific application of the processing system 114 and the overall design constraints. The bus 102 links together various circuits including one or more processors, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. An optional bus interface 108 may be utilized to provide an interface between the bus 102, the transceiver 110, and/or the optional user interface 112. As such, it should be appreciated that the transceiver 110 may be coupled directly to the bus 102 without the bus interface 108. The transceiver 110 provides a means for communicating with various other apparatus over a transmission medium. The transceiver 110 may be configured as a transmitter including a means for transmitting, as a receiver including a means for receiving, and/or a transceiver including a means for both transmitting and receiving. Depending on the nature of the apparatus 100, the user interface 112 (e.g., keypad, touchpad, monitor, display, speaker, microphone, joystick) may also be provided to interface with a user.

The processor 104 is configured for managing the bus 102 and general processing, including the execution of software stored on the computer-readable medium 106. The software, when executed by the processor 104, causes the processing system 114 to perform the various functions and/or operations described herein for any particular apparatus. The memory 105 and/or the computer-readable medium 106 may be utilized for storing data that is manipulated by the processor 104 when executing software.

Figure 1B:
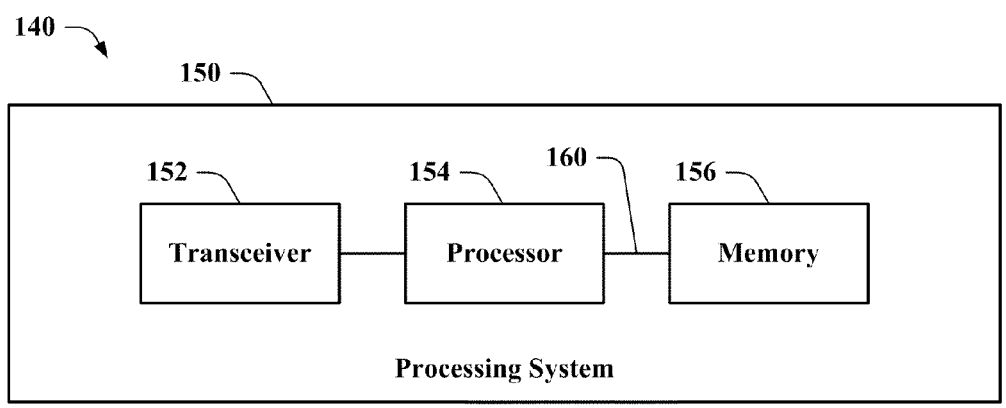

FIG. 1B is a diagram illustrating a hardware implementation of an apparatus 140 comprising, for example, a processing system 150 for wireless communication, in accordance with aspects of the disclosure. The apparatus 140 is configured to operate as a relay, and the processing system 150 is configured to receive a signal, decode the received signal, and forward or transmit the decoded signal. In an implementation, the processing system 150 includes a processor 154 and a memory 156 coupled together via a bus 160 for exchanging data and information. The processing system 150 comprises a transceiver 152 coupled to the processor 154 as shown in FIG. 1B. In an implementation, the transceiver 152 may be integrated as part of the processor 154. The transceiver 152 may be configured to receive input signals. In an implementation, the transceiver 152 may comprise a wireless receiving component and/or a wired or optical input interface for receiving input. The transceiver 152 is further configured to provide output signals. In an implementation, the transceiver 152 may comprise a wireless transmitting component and/or a wired or optical output interface for transmitting output. As such, the transceiver 152 may comprise a means for receiving and/or a means for transmitting.

In accordance with aspects of the disclosure, the processing systems 114, 150 of FIGS. 1A and 1B may be configured to utilize a control channel configuration module for scrambling (or encoding) one or more control channels with an identifier, such as a special Radio Network Temporary Identifier (RNTI) value or MAC identification (ID) value. In an implementation, each receiving node in the wireless communication system may be configured to decode the scrambled (or encoded) control channel with the identifier. As such, the identifier (e.g., RNTI value or MAC ID value) may be known by various nodes, such as Relay Nodes (RNs), Base Stations (BSs), Access Points (APs), and/or Access Terminals (ATs), in the wireless communication network. In some implementations, the control channel is utilized by nodes to update system information and/or page other nodes, such as RNs. In some implementations, the control channel may be an anchor control channel.

In accordance with aspects of the disclosure, the processing systems 114, 150 of FIGS. 1A and 1B may be configured to utilize the control channel configuration module for conveying control span information in a number of different ways. For instance, different interleavers may be employed for different control spans, and receiving nodes may apply blind decoding or testing on different hypotheses (e.g., different potential interleavers) to determine control spans and decode the control channels. As such, in various implementations, receiving nodes may apply blind hypothesis testing for different potential interleavers to determine control spans and decode the control channels. In an implementation, a control channel in the data region (e.g., a R-PDCCH in the relay context) may span multiple Resource Blocks (RBs), and an interleaver may be used to spread out the R-PDCCH over multiple RBs. It should be appreciated that while the term R-PDCCH may be used herein, the term may generally apply to any control channel mapped to a data region.

In another implementation, the control span for uplink (UL) grant information may be linked to the control span of the downlink (DL) grant information. For example, the control spans may be the same in some embodiments. In another example, the DL control span may be the lower (or upper) bound of the UL control span.

In another implementation, the aggregation level for control for the UL grant information may be linked to the aggregation size of the DL grant information for the same node (e.g., RN or UE). For example, the aggregation level and size may be the same in some embodiments. In another example, the aggregation size of the grant in the DL may be the lower (or upper) bound of the aggregation size of the UL grant.

In another implementation, an interleaver utilized for the UL grant information may be linked to an interleaver used for DL grant information. For example, an interleaver may be a shifted version of another interleaver. Such a configuration may, in some embodiments, enable a receiver to retrieve received resource Elements (REs) when trying different blind decoding (e.g., blind hypothesis testing for different potential interleavers) of the DL grant and the UL grant in the same physical resource.

In accordance with aspects of the disclosure, the processing systems 114, 150 of FIGS. 1A and 1B may be configured to utilize the control channel configuration module to map DL grant information and/or UL grant information to Resource Elements (REs). This may be achieved, for example, by first mapping the DL grant information to the DL control region and then mapping the UL grant information to the UL control region. In an implementation, the UL control region may be orthogonal to the DL control region in the frequency domain and/or in the time domain or both of them, for example, so that the UL control region and the DL control region do not overlap.

In some implementations, when there are available UL grants when the REs in the control region have all been used, a UL grant may be mapped to all or part of the unused region of the DL grant region. The region used for the UL grant in the DL control region may be restricted such that receivers may apply blind decoding (e.g., blind hypothesis testing for different potential interleavers) to find out the existence and length of the extended control region for the UL grant in the DL control region.

Figure 2:
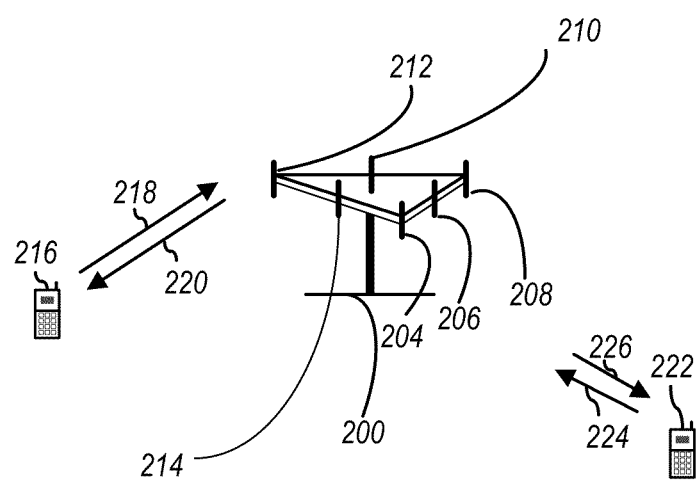
FIG. 2 is a diagram illustrating a multiple access wireless communication system, in accordance with aspects of the disclosure.

FIG. 2 is a diagram illustrating an embodiment of a multiple access wireless communication system, in accordance with aspects of the disclosure. An access point 200 (AP) includes multiple antenna groups, for example, one including 204 and 206, another including 208 and 210, and an additional including 212 and 214. In FIG. 2, only two antennas are shown for each antenna group; however, more or fewer antennas may be utilized for each antenna group. In an implementation, an access terminal 216 (AT) is in communication with antennas 212 and 214, where antennas 212 and 214 transmit information to access terminal 216 over forward link or downlink (DL) 220 and receive information from access terminal 216 over reverse link or uplink (UL) 218. In an implementation, an access terminal 222 is in communication with antennas 206 and 208, where antennas 206 and 208 transmit information to access terminal 222 over forward link or downlink (DL) 226 and receive information from access terminal 222 over reverse link or uplink (UL) 224. In various implementations, one or more relay devices (i.e., relay nodes) may be positioned proximate to the access point 200 and the access terminals 216, 222 to relay communications therebetween, respectively.

In accordance with aspects of the disclosure, in a frequency division duplexing (FDD) system, the communication links 218, 220, 224 and 226 may use different frequency for communication. For example, the forward link or downlink (DL) 220 may use a different frequency then that utilized by the reverse link or uplink (UL) 218.

In accordance with aspects of the disclosure, each group of antennas and/or the area in which they are designed to communicate may be referred to as a sector of the access point. In an example, each antenna group may be designed to communicate to access terminals in a sector of the areas covered by the access point 200.

In accordance with aspects of the disclosure, when communicating over the forward links or downlinks (DLs) 220, 226, the transmitting antennas of the access point 200 utilize beamforming to improve a signal-to-noise ratio of the forward links or downlinks 220, 226 for the different access terminals 216 and 224, respectively. Also, in an implementation, an access point utilizing beamforming to transmit to access terminals scattered randomly through its coverage causes less interference to access terminals in neighboring cells than an access point transmitting through a single antenna to all its access terminals.

In accordance with aspects of the disclosure, an access point may be a fixed station utilized for communicating with the terminals and may also be referred to as an access point (AP), a Node B (NB), evolved Node B (eNB), or some other terminology. An access terminal may be referred to as an access terminal (AT), user equipment (UE), a wireless communication device, terminal, or some other terminology. Moreover, an access point may be a macrocell access point, femtocell access point, picocell access point, and/or the like.

In various embodiments, as described herein, one or more segments or one or more extension carriers may be linked to a regular carrier resulting in a composite bandwidth over which the UE may transmit information to, and/or receive information from, the eNB.

In accordance with aspects of the disclosure, the wireless communication system of FIG. 2 facilitates communicating common control data over control resources at various aggregation levels. The access point (AP) 200 may be configured to provide wireless network access to the access terminals (ATs) 216, 222. The access point 802 may comprise an aggregation level selecting module that is configured to determine an aggregation level for transmitting control data related to each of the access terminals 216, 222 over common control resources and a control data communicating module that transmits the control data to the access terminals 216, 222 in a common search space using the aggregation level. The access terminals 216, 222 may comprise a control resource monitoring module that searches common control resources for data related to the access terminals 216, 222 and a control data determining module that extracts control data from the common control resources.

In an implementation, the aggregation level selecting module may be utilized to determine an aggregation level for communicating control data over common control resources to the access terminals 216, 222. In an example, the common control resources may relate to PDCCH, Relay-PDCCH, and/or similar resources. In addition, the aggregation level selecting module may be utilized to determine the aggregation level for the access terminals 216, 222 (e.g., based on SNR, required bandwidth, etc.) and may utilize not only aggregation levels 8 and 4 for 16 CCE common search space, but also levels less than 4 (e.g., 1, 2, etc.). The control data communicating module may be utilized to transmit control data for each access terminal 216, 222 in the common control resources in at least one common search space using the selected aggregation level. These and other aspects are described in greater detail herein.

In an implementation, the control resource monitoring module may be utilized to search the common search spaces of the common control resources to locate control data resources related to the access terminals 216, 222. In an example, the control resource monitoring module may be utilized to search the common search space at corresponding aggregation levels to enhance the searching process. Once the control resource monitoring module is utilized to locate control data in the common control resources related to the access terminals 216, 222, the control data determining module may be utilized to determine control data in the corresponding resources.

In an implementation, the aggregation level selecting module may be utilized to schedule an aggregation level 2 in the common search space for control data related to the access terminals 216, 222. In an example, the control data communicating module may be utilized to populate consecutive candidates, each including 2 contiguous Control Channel Elements (CCEs), of the common search space with the control data, starting with the first CCE in the common search space. In another example, the control data communicating module may be utilized to populate non-consecutive candidates of 2 contiguous CCEs of the common search space with the control data. It should be appreciated that the population scheme utilized by the control data communicating module may be defined according to a configuration, hardcoding, network specification, etc., and/or may be dynamic for a given access terminal, in a given subframe, and/or the like. As such, in an implementation, the control resource monitoring module may be utilized to search the common search space within the control data resources and determine whether the contiguous or non-contiguous aggregation level 2 CCEs relate to an access terminal.

In an implementation, an aggregation level of a common search space related to common control resources may be determined, and control data may be received over the common control resources. As described herein, the aggregation level may be level 8, 4, less than 4, etc. for 16 control channel elements (CCEs). In an example, control data may be received from one or more candidates in the common search space that include contiguous CCEs according to the aggregation level. As described herein, when the aggregation level is less than 4, the candidates may be contiguous or non-contiguous, and the candidates may not comprise the entire common search space.

Figure 3A:
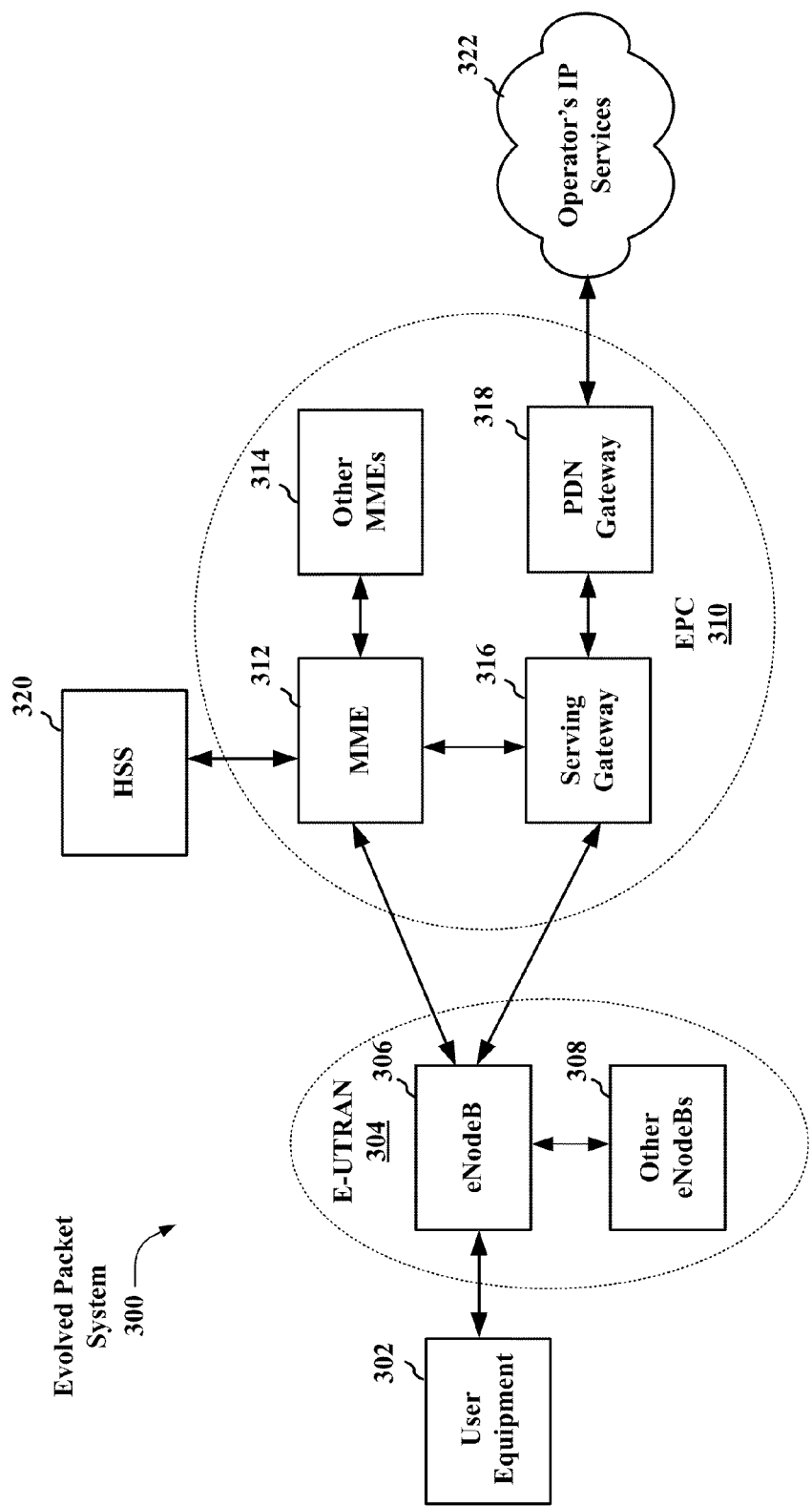
FIG. 3A is a diagram illustrating an example of a network architecture, in accordance with aspects of the disclosure.

FIG. 3A is a diagram illustrating an embodiment of a Long Term Evolution (LTE) network architecture 300, in accordance with aspects of the disclosure. The LTE network architecture 300 may be referred to as an Evolved Packet System (EPS) 300. The EPS 300 may include one or more user equipment (UE) 302, an Evolved UMTS Terrestrial Radio Access Network (E-UTRAN) 304, an Evolved Packet Core (EPC) 310, a Home Subscriber Server (HSS) 320, and an Operator's IP Services 322. The EPS may interconnect with other access networks, but for simplicity, those entities/interfaces are not shown. As shown in FIG. 3A, the EPS 300 provides packet-switched services. However, as those skilled in the art will readily appreciate, the various concepts presented throughout this disclosure may be extended to networks providing circuit-switched services. Further, it should be appreciated that each of the apparatuses and/or devices in the EPS 300 may each comprise the apparatus 100 of FIG. 1, without departing from the scope of the disclosure.

The E-UTRAN includes the evolved Node B (eNB) 306 and/or one or more other eNBs 308. The eNB 306 provides user and control plane protocol terminations toward the UE 302. The eNB 306 may be connected to one or more other eNBs 308 via an X2 interface (i.e., backhaul). The eNB 306 may be referred to by those skilled in the art as a base station, a base transceiver station, a radio base station, a radio transceiver, a transceiver function, a basic service set (BSS), an extended service set (ESS), or some other suitable terminology. The eNB 306 provides an access point to the EPC 310 for a UE 302. Examples of the UE 302 include a cellular phone, a smart phone, a session initiation protocol (SIP) phone, a laptop, a personal digital assistant (PDA), a satellite radio, a global positioning system (GPS), a multimedia device, a video device, a digital audio player (e.g., MP3 player), a camera, a game console, or any other similar functioning device. The UE 302 may be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In an implementation, a relay device (i.e., relay node (RN)) may be interposed between the UE 302 and the eNodeB 306 to relay communications therebetween.

The eNB 306 is connected by an S1 interface to the EPC 310. The EPC 310 includes a Mobility Management Entity (MME) 312, other MMEs 314, a Serving Gateway 316, and a Packet Data Network (PDN) Gateway 318. The MME 312 is the control node that processes the signaling between the UE 302 and the EPC 310. The MME 312 is configured to provide bearer and connection management. User IP packets are transferred through the Serving Gateway 316, which itself is connected to the PDN Gateway 318. The PDN Gateway 318 provides UE Internet Protocol (IP) address allocation and/or other functions. The PDN Gateway 318 is connected to the Operator's IP Services 322. The Operator's IP Services 322 may include the Internet, an intranet, an IP Multimedia Subsystem (IMS), and a PS Streaming Service (PSS).

Figure 3B:
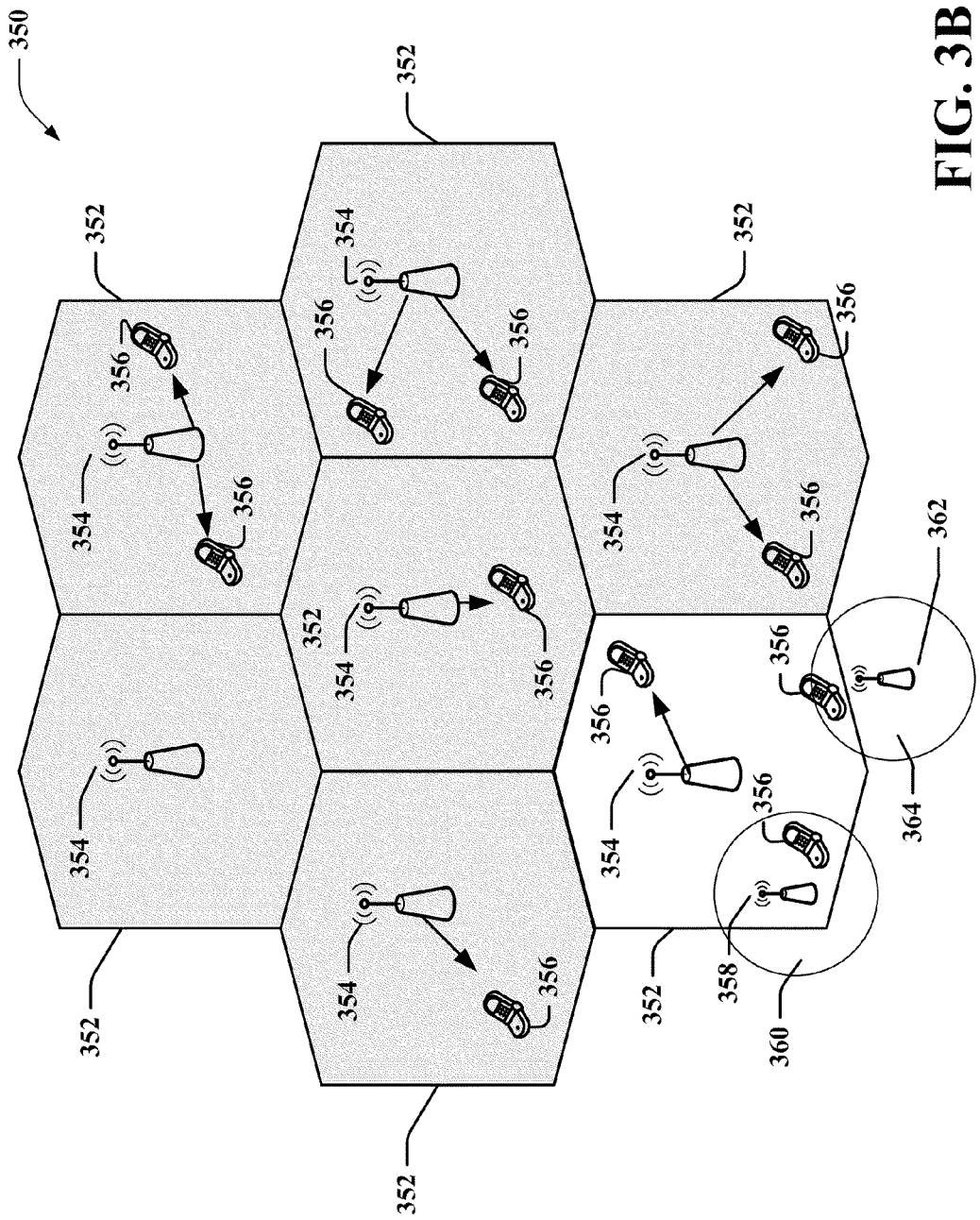
FIG. 3B is a diagram illustrating an example of an access network, in accordance with aspects of the disclosure.

FIG. 3B is a diagram illustrating an example of an access network in an LTE network architecture, in accordance with aspects of the disclosure. In an example, the access network 350 is divided into a number of cellular regions (cells) 352. One or more lower power class eNBs 358, 362 may have cellular regions 360, 364, respectively, that overlap with one or more of the cellular regions or cells 352. The lower power class eNBs 358, 362 may be femto cells (e.g., home eNBs (HeNBs)), pico cells, or micro cells. A higher power class or macro eNB 354 is assigned to a cell 352 and is configured to provide an access point to the EPC 310 for the UEs 356 in the cell 352. Even though there is no centralized controller in this example of the access network 350, a centralized controller may be utilized in alternative configurations. The eNB 354 is responsible for one or more radio related functions including radio bearer control, admission control, mobility control, scheduling, security, and connectivity to the serving gateway 316 (e.g., in FIG. 3A).

The modulation and multiple access scheme utilized by the access network 350 may vary depending on a particular telecommunications standard being deployed. In LTE applications, OFDM is utilized on the downlink (DL) and SC-FDMA is utilized on the uplink (UL) to support both frequency division duplexing (FDD) and time division duplexing (TDD). As those skilled in the art may readily appreciate from the description that follows, the various concepts presented herein are well suited for LTE applications. However, these concepts may be readily extended to various other telecommunication standards utilizing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. It should be appreciated that the actual wireless communication standard and the multiple access technology employed will depend on the specific application and the overall design constraints imposed on the system.

In an aspect of the disclosure, the eNB 354 may have multiple antennas supporting MIMO technology. The utilization of MIMO technology enables the eNB 354 to exploit the spatial domain to support spatial multiplexing, beamforming, and transmit diversity.

Spatial multiplexing may be utilized to transmit different streams of data simultaneously on the same frequency. In an example, data steams may be transmitted to a single UE 356 to increase data rate, or in another example, data steams may be transmitted to multiple UEs 356 to increase overall system capacity. This may be achieved by spatially precoding each data stream (i.e., applying a scaling of an amplitude and a phase) and then transmitting each spatially precoded stream through multiple transmit antennas on the downlink (DL). The spatially precoded data streams arrive at the UE(s) 356 with different spatial signatures, which enables each of the UE(s) 356 to recover the one or more data streams destined for that UE 356. On the uplink (UL), each UE 356 transmits a spatially precoded data stream, which enables the eNB 354 to identify the source of each spatially precoded data stream. In various implementations, one or more relay devices (i.e., relay nodes (RNs)) may be positioned between or at least proximate to one or more eNBs 354 and one or more UEs 356 to relay communications therebetween.

In accordance with aspects of the disclosure, spatial multiplexing is utilized when channel conditions are favorable. When channel conditions are less favorable, beamforming may be utilized to focus transmission energy in one or more directions. This may be achieved by spatially precoding the data for transmission through multiple antennas. To achieve good coverage at the edges of a cell, a single stream beamforming transmission may be utilized in combination with transmit diversity.

Various aspects of an access network will be described with reference to a MIMO system supporting OFDM on downlink (DL) and SC-FDMA on uplink (UL). OFDM is a spread-spectrum technique that modulates data over a number of subcarriers within an OFDM symbol. The subcarriers are spaced apart at precise frequencies. The spacing provides "orthogonality" that enables a receiver to recover data from subcarriers. In the time domain, a guard interval (e.g., cyclic prefix) may be added to each OFDM symbol to combat inter-OFDM-symbol interference. The uplink may use SC-FDMA in the form of a DFT-spread OFDM signal to compensate for high peak-to-average power ratio (PARR).

Figure 4A:
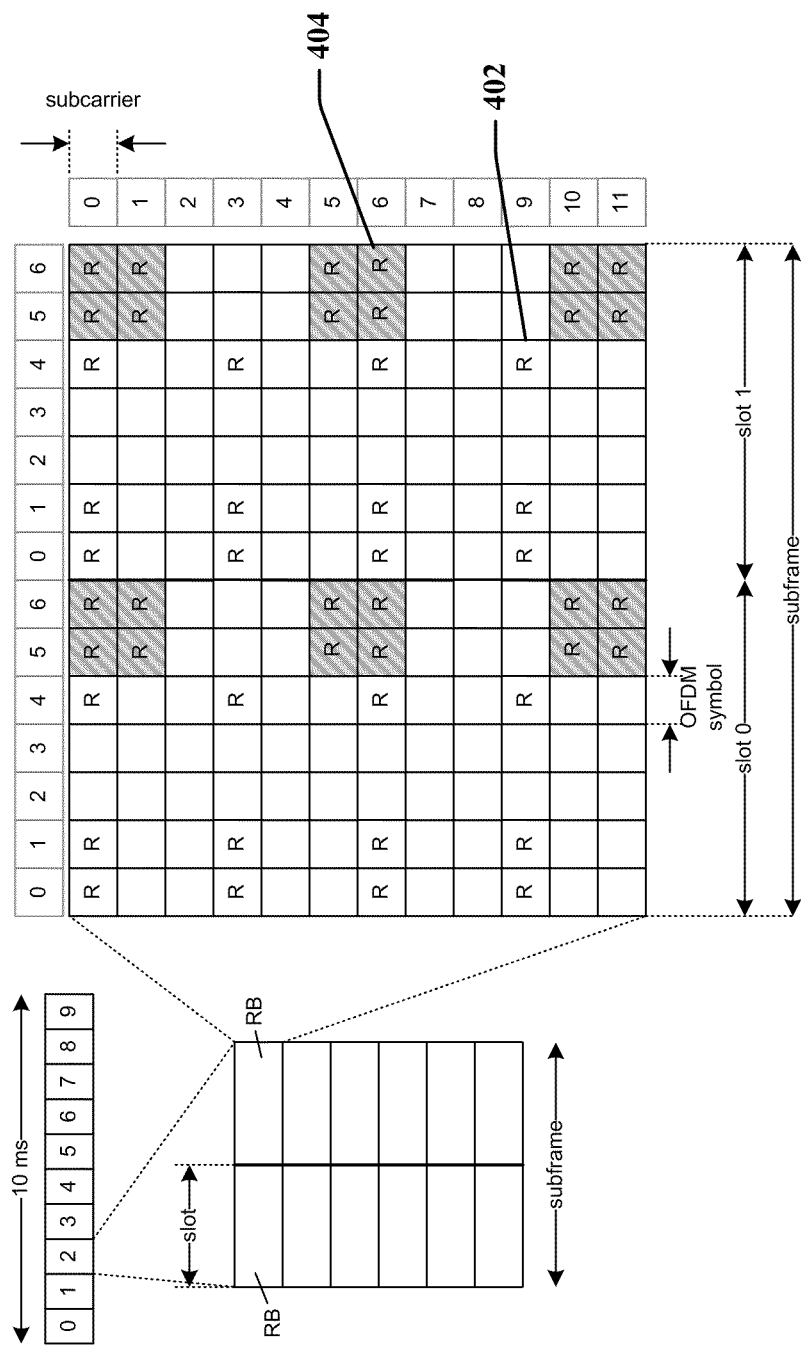
FIG. 4A is a diagram illustrating an example of a frame structure for use in an access network, in accordance with aspects of the disclosure.

In accordance with aspects of the disclosure, various frame structures may be utilized to support downlink (DL) and uplink (UL) transmissions. An example of a DL frame structure will now be presented with reference to FIG. 4A. However, as those skilled in the art will readily appreciate, the frame structure for any particular application may be different depending on any number of factors. In this example, a frame (10 ms) is divided into 10 equally sized sub-frames. Each sub-frame includes two consecutive time slots.

In an implementation, a resource grid may be utilized to represent two time slots, each time slot including a Resource Block (RB). The resource grid is divided into multiple Resource Elements (REs). In LTE, a Resource Block (RB) may include 12 consecutive subcarriers in the frequency domain and, for a normal cyclic prefix in each OFDM symbol, 7 consecutive OFDM symbols in the time domain, or 84 Resource Elements (REs). Some of the REs, as indicated as R 402 and 404, may include DL Reference Signals (DL-RS). The DL-RS include Cell-specific RS (CRS) (which may be referred to as common RS) 402 and UE-specific RS (UE-RS) 404. UE-RS 404 may be transmitted only on the RBs upon which a corresponding Physical Downlink Shared CHannel (PDSCH) is mapped. The number of bits carried by each RE may depend on the modulation scheme. As such, the more RBs that a UE receives and the higher the modulation scheme, the higher the data rate for the UE.

Figure 4B:
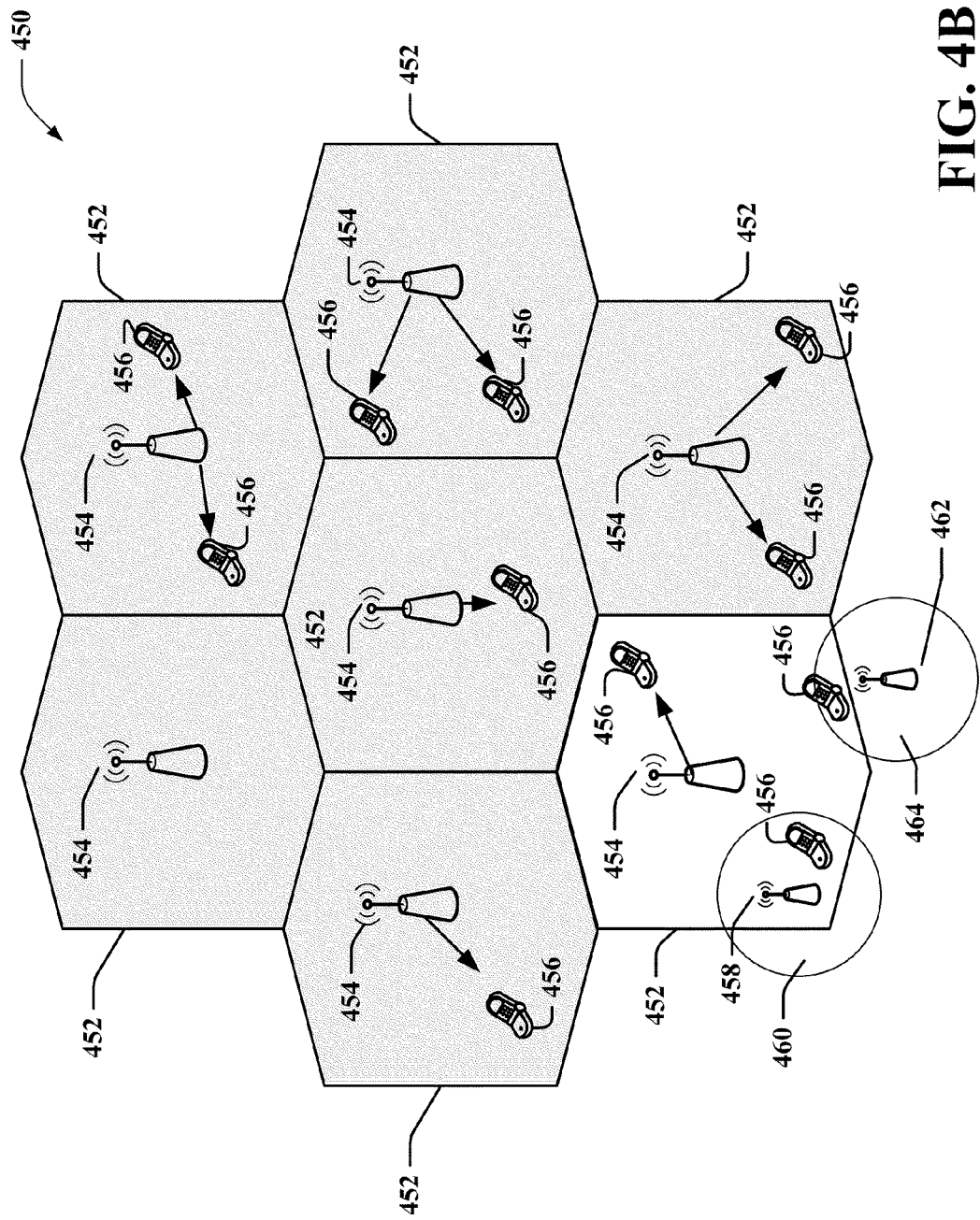
FIG. 4B is a diagram illustrating an example of a format for an uplink (UL) in a Long Term Evolution (LTE) network, in accordance with aspects of the disclosure.

Referring to FIG. 4B, an example of a UL frame structure 420 is provided in an embodiment of a format for the UL in LTE. Available Resource Blocks (RBs) for the UL may be partitioned into a data section and a control section. The control section may be formed at the two edges of the system bandwidth and may have a configurable size. The RBs in the control section may be assigned to UEs for transmission of control information. The data section may include RBs not included in the control section. The design in FIG. 4B results in the data section including contiguous subcarriers, which may allow a single UE to be assigned one or more of the contiguous subcarriers in the data section.

In an implementation, a UE may be assigned Resource Blocks (RBs) 430a, 430b in a control section to transmit control information to an eNB. The UE may be assigned RBs 440a, 440b in a data section to transmit data to the eNB. The UE may transmit control information in a Physical Uplink Control CHannel (PUCCH) on the assigned RBs in the control section. The UE may transmit only data or both data and control information in a Physical Uplink Shared CHannel (PUSCH) on the assigned RBs in the data section. A UL transmission may span both slots of a subframe and may hop across frequency, in a manner as shown in FIG. 4B.

In an aspect of the disclosure, referring to FIG. 4B, a set of RBs may be utilized to perform initial system access and achieve UL synchronization in a Physical Random Access CHannel (PRACH) 450. The PRACH 450 is configured to carry a random sequence and cannot carry any UL data/signaling. Each random access preamble occupies bandwidth corresponding to six consecutive RBs. The starting frequency may be specified by the network. That is, the transmission of the random access preamble is restricted to certain time and frequency resources. There is no frequency hopping for the PRACH. The PRACH attempt is carried in a single subframe (1 ms), and a UE may make only a single PRACH attempt per frame (10 ms).

It should be appreciated that the PUCCH, PUSCH, and PRACH in LTE are described in reference to 3GPP TS 36.211, entitled "Evolved Universal Terrestrial Radio Access (E-UTRA); Physical Channels and Modulation," which is publicly available.

The radio protocol architecture may take on various forms depending on the particular application. An example for an LTE system will now be presented with reference to FIG. 4C. In an aspect of the disclosure, FIG. 4C is a conceptual diagram illustrating an example of the radio protocol architecture for the user and control planes.

Figure 4C:
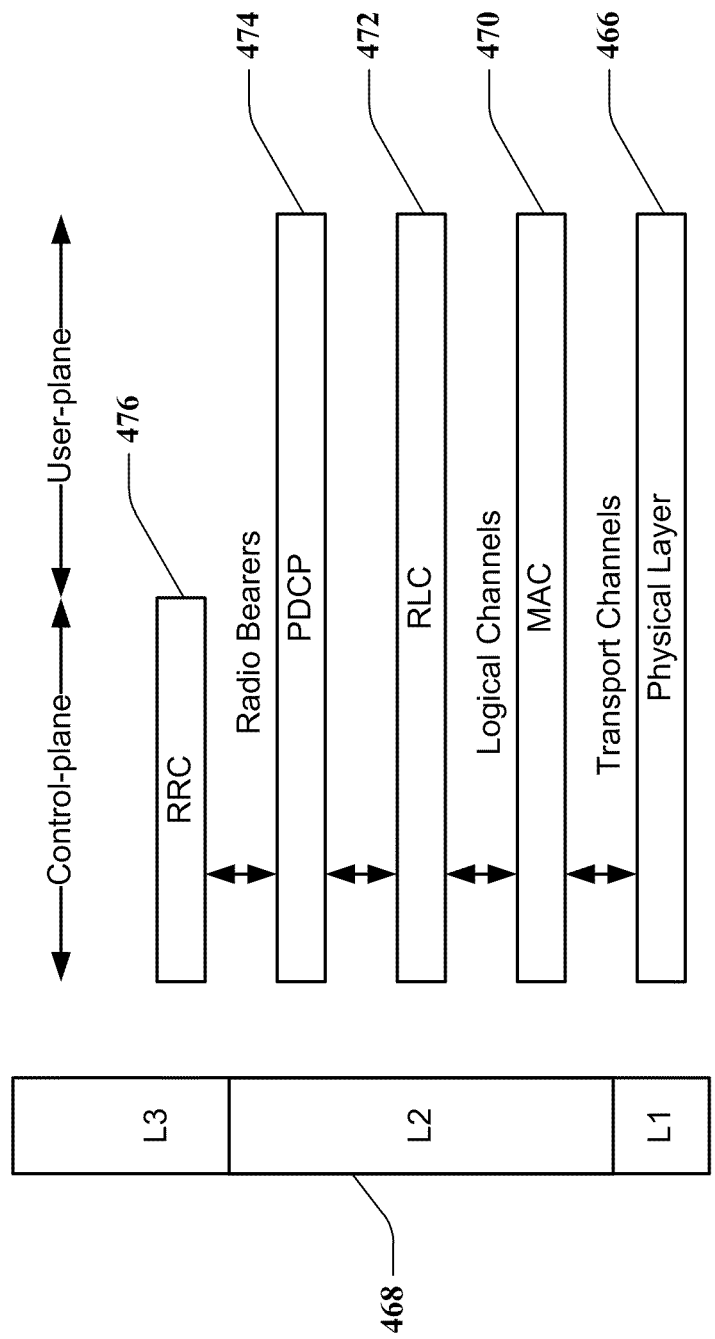
FIG. 4C is a diagram illustrating an example of a radio protocol architecture for the user and control plane, in accordance with aspects of the disclosure.

Referring to FIG. 4C, the radio protocol architecture for the UE and the eNB is shown with three layers: Layer 1 (L1), Layer 2 (L2), and Layer 3 (L3). L1 is the lowest layer and implements various physical layer signal processing functions. L1 is referred to herein as a physical layer 466. L2 468 is above the physical layer (L1) 466 and is responsible for the link between the UE and eNB over the physical layer (L1) 466.

In the user plane, the L2 layer 468 includes a media access control (MAC) sublayer 470, a radio link control (RLC) sublayer 472, and a Packet Data Convergence Protocol (PDCP) 474 sublayer, which are terminated at the eNB on the network side. Although not shown, the UE may have several upper layers above the L2 layer 468 including a network layer (e.g., IP layer) that is terminated at the PDN gateway 318 (e.g., see FIG. 3A) on the network side, and an application layer that is terminated at the other end of the connection (e.g., far end UE, server, etc.).

The PDCP sublayer 474 provides multiplexing between different radio bearers and logical channels. The PDCP sublayer 474 may provide header compression for upper layer data packets to reduce radio transmission overhead, security by ciphering the data packets, and/or handover support for UEs between eNBs. The RLC sublayer 472 provides segmentation and reassembly of upper layer data packets, retransmission of lost data packets, and/or reordering of data packets to compensate for out-of-order reception due to Hybrid Automatic Repeat Request (HARQ). The MAC sublayer 470 provides multiplexing between logical and transport channels, and the MAC sublayer 470 is responsible for allocating the various radio resources (e.g., RBs) in one cell among the UEs. The MAC sublayer 470 is responsible for HARQ operations.

In the control plane, the radio protocol architecture for the UE and eNB is substantially the same for the physical layer 466 and the L2 layer 468 with the exception that there is no header compression function for the control plane. The control plane includes a Radio Resource Control (RRC) sublayer 476 in Layer 3. The RRC sublayer 476 is responsible for obtaining radio resources (i.e., radio bearers) and for configuring the lower layers utilizing RRC signaling between the eNB and the UE.

Figure 5:
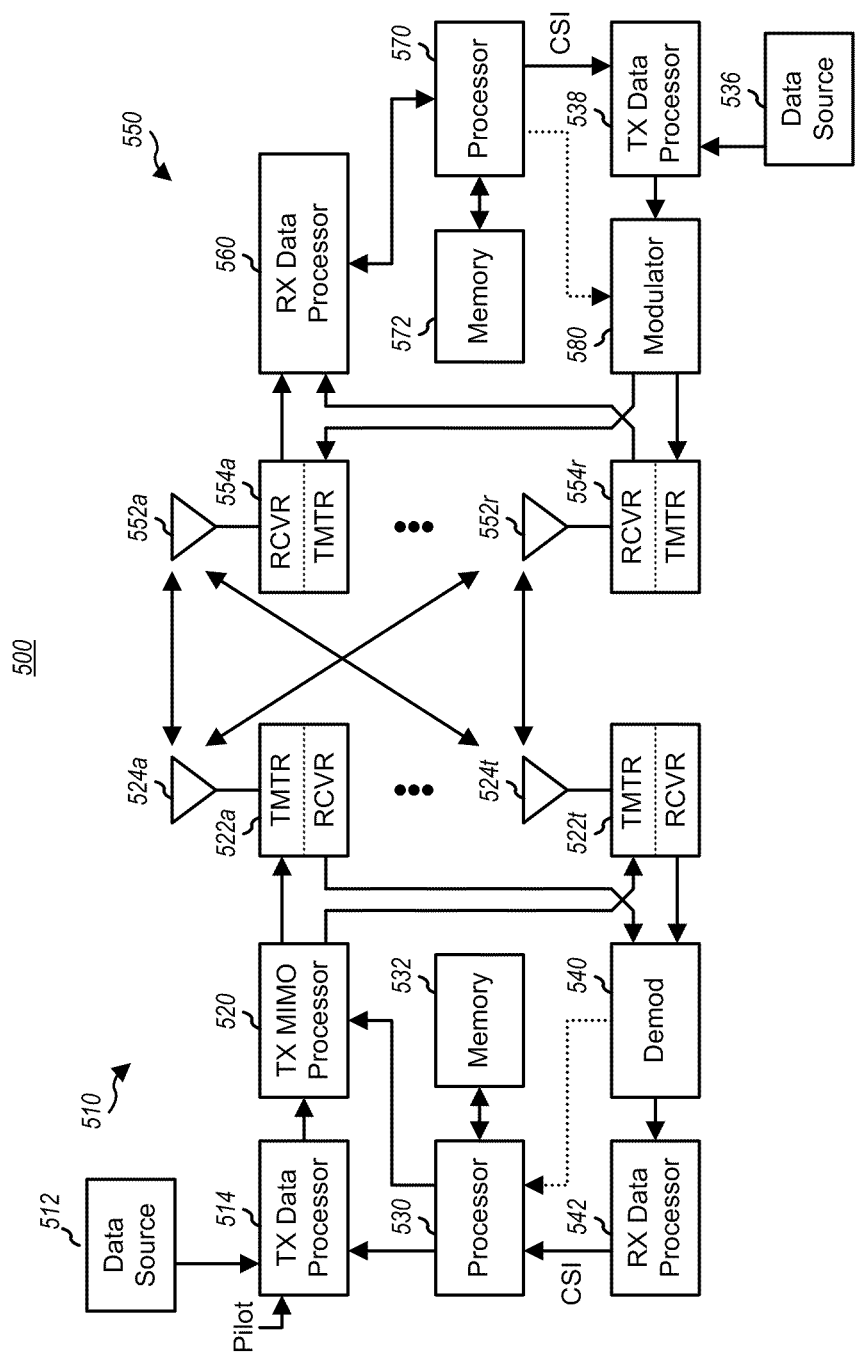
FIGS. 5 and 6 are block diagrams illustrating examples of wireless communication systems, in accordance with aspects of the disclosure.
Figure 5A:
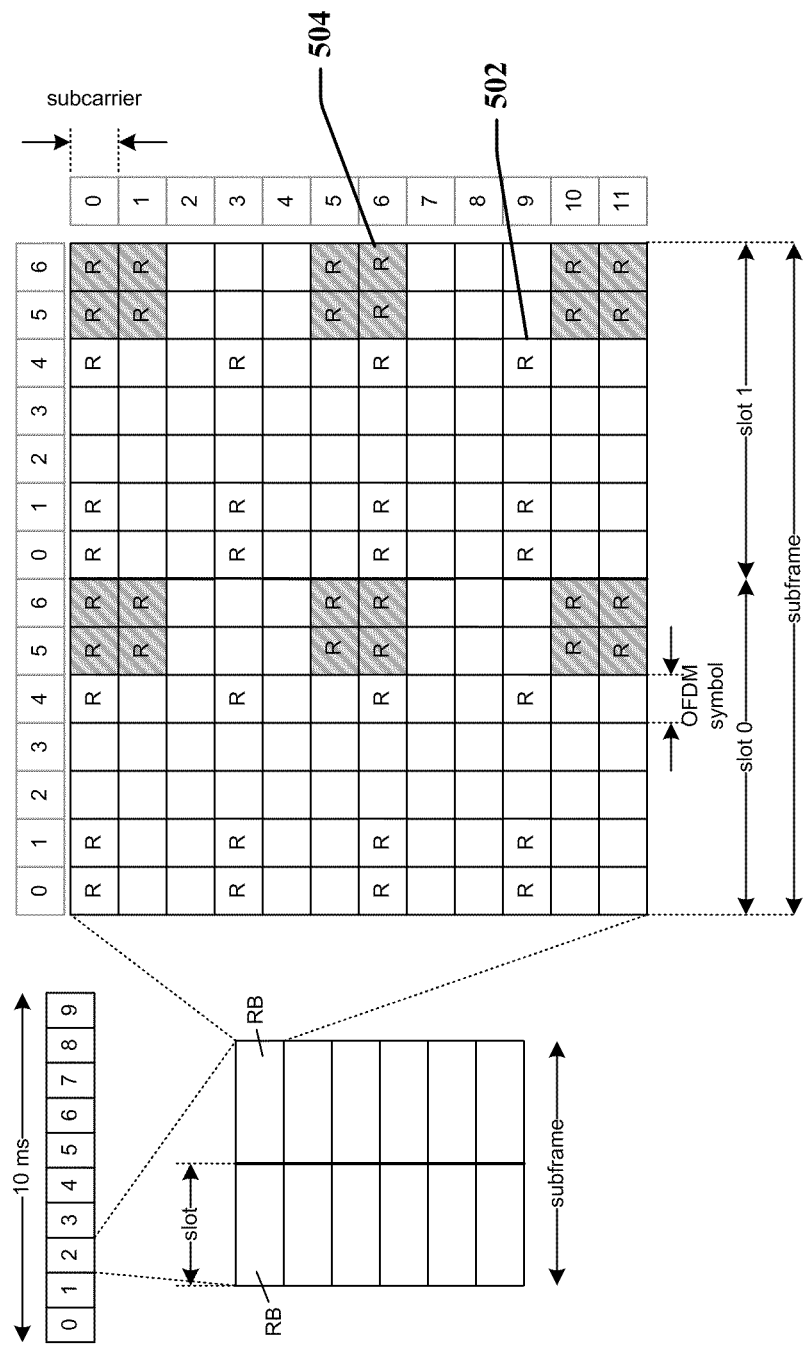

FIG. 5 is a block diagram of an embodiment of a transmitter system 510 (e.g., an access point) and a receiver system 550 (e.g., an access terminal) in a MIMO system 500, in accordance with an aspect of the disclosure. At the transmitter system 510, traffic data for a number of data streams is provided from a data source 512 to a transmit (TX) data processor 514. Each data stream may be transmitted over a respective transmit antenna, and the TX data processor 514 may format, code, and interleave the traffic data for each data stream based on a particular coding scheme selected for that data stream to provide coded data. In an implementation, a relay system may be interposed between the transmitter system 510 and the receiver system 550 to relay communications therebetween.

The coded data for each data stream may be multiplexed with pilot data utilizing Orthogonal Frequency Division Multiplexing (OFDM) techniques. The pilot data is typically a known data pattern that is processed in a known manner and may be utilized at the receiver system to estimate the channel response. The multiplexed pilot and coded data for each data stream is then modulated (i.e., symbol mapped) based on a particular modulation scheme (e.g., Binary Phase-Shift Keying (BPSK), Quadrature Phase-Shift Keying (QPSK), M-Phase-Shift Keying (M-PSK), M-Quadrature Amplitude Modulation (M-QAM)) selected for that data stream to provide modulation symbols. The data rate, coding, and modulation for each data stream may be determined by instructions performed by processor 530.

The modulation symbols for all data streams are then provided to a TX MIMO processor 520, which may further process the modulation symbols (e.g., for OFDM). The TX MIMO processor 520 then provides $N_T$ modulation symbol streams to the $N_T$ transmitters (TMTR) 522a through 522t. In certain embodiments, the TX MIMO processor 520 applies beamforming weights to the symbols of the data streams and to the antenna from which the symbol is being transmitted.

Each transmitter 522 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from the transmitters 522a through 522t are then transmitted from the $N_T$ antennas 524a through 524t, respectively.

At the receiver system 550, the transmitted modulated signals are received by the $N_R$ antennas 552a through 552r and the received signal from each antenna 552 is provided to a respective receiver (RCVR) 554a through 554r. Each receiver 554 conditions (e.g., filters, amplifies, and/or downconverts) a respective received signal, digitizes the conditioned signal to provide samples, and further processes the samples to provide a corresponding "received" symbol stream.

An RX data processor 560 then receives and processes the $N_R$ received symbol streams from the $N_R$ receivers 554 based on a particular receiver processing technique to provide $N_T$ "detected" symbol streams. The RX data processor 560 then demodulates, deinterleaves, and decodes each detected symbol stream to recover the traffic data for the data stream. The processing by the RX data processor 560 is complementary to that performed by the TX MIMO processor 520 and the TX data processor 514 at the transmitter system 510. In an embodiment, a processor 570 is configured to periodically determine which pre-coding matrix to use (discussed below). The processor 570 formulates a reverse link or UL message comprising a matrix index portion and a rank value portion.

In an aspect of the disclosure, the reverse link or UL message may comprise various types of information regarding the communication link and/or the received data stream. The reverse link or uplink (UL) message is then processed by a TX data processor 538, which also receives traffic data for a number of data streams from a data source 536, modulated by a modulator 580, conditioned by the transmitters 554a through 554r, and transmitted back to the transmitter system 510.

At the transmitter system 510, the modulated signals from the receiver system 550 are received by the antennas 524, conditioned by the receivers 522, demodulated by a demodulator 540, and processed by a RX data processor 542 to extract the reverse link or uplink (UL) message transmitted by the receiver system 550. The processor 530 then determines which pre-coding matrix to use for determining the beamforming weights then processes the extracted message.

In accordance with aspects of the disclosure, logical channels are classified into Control Channels and Traffic Channels. Logical Control Channels comprises Broadcast Control CHannel (BCCH), which is downlink (DL) channel for broadcasting system control information. Paging Control CHannel (PCCH), which is DL channel that transfers paging information. Multicast Control CHannel (MCCH), which is point-to-multipoint DL channel utilized for transmitting Multimedia Broadcast and Multicast Service (MBMS) scheduling and control information for one or several MTCHs. Generally, after establishing RRC connection, this channel is only utilized by UEs that receive MBMS (Note: old MCCH+MSCH). Dedicated Control CHannel (DCCH) is point-to-point bi-directional channel that transmits dedicated control information and utilized by UEs having an RRC connection. Logical Traffic Channels comprise a Dedicated Traffic Channel (DTCH), which is point-to-point bi-directional channel, dedicated to one UE, for the transfer of user information. Also, a Multicast Traffic CHannel (MTCH) for point-to-multipoint DL channel for transmitting traffic data.

In accordance with aspects of the disclosure, Transport Channels may be classified into downlink (DL) and uplink (UL). DL Transport Channels comprises a Broadcast CHannel (BCH), Downlink Shared Data CHannel (DL-SDCH) and a Paging CHannel (PCH), the PCH for support of UE power saving (DRX cycle is indicated by the network to the UE), broadcasted over entire cell and mapped to PHY resources which may be utilized for other control/traffic channels. The UL Transport Channels comprises a Random Access CHannel (RACH), a Request CHannel (REQCH), an Uplink Shared Data CHannel (UL-SDCH) and plurality of PHY channels. The PHY channels comprise a set of Downlink (DL) channels and Uplink (UL) channels.

The DL PHY channels comprises:
Common Pilot CHannel (CPICH)
Synchronization CHannel (SCH)
Common Control CHannel (CCCH)
Shared DL Control CHannel (SDCCH)
Multicast Control CHannel (MCCH)
Shared UL Assignment CHannel (SUACH)
Acknowledgement CHannel (ACKCH)
DL Physical Shared Data CHannel (DL-PSDCH)
UL Power Control CHannel (UPCCH)
Paging Indicator CHannel (PICH)
Load Indicator CHannel (LICH)
The UL PHY Channels comprises:
Physical Random Access CHannel (PRACH)
Channel Quality Indicator CHannel (CQICH)
Acknowledgement CHannel (ACKCH)
Antenna Subset Indicator CHannel (ASICH)
Shared Request CHannel (SREQCH)
UL Physical Shared Data CHannel (UL-PSDCH)
Broadband Pilot CHannel (BPICH)

In an aspect of the disclosure, a channel structure is provided that preserves low PAR (at any given time, the channel is contiguous or uniformly spaced in frequency) properties of a single carrier waveform.

For the purposes of the disclosure, the following abbreviations apply:
ACK Acknowledgement
AM Acknowledged Mode
AMD Acknowledged Mode Data
AMR Adaptive Multi-Rate ARQ Automatic Repeat Request
BCCH Broadcast Control CHannel
BCH Broadcast CHannel
BPSK Binary Phase-Shift Keying
BW Bandwidth
C- Control-
CCE Control Channel Element
CCCH Common Control CHannel
CCH Control CHannel
CCTrCH Coded Composite Transport CHannel
CDM Code Division Multiplexing
CP Cyclic Prefix
CQI Channel Quality Indicator
CRC Cyclic Redundancy Check
CRS Common Reference Signal
CTCH Common Traffic CHannel
DCCH Dedicated Control CHannel
DCH Dedicated CHannel
DCI Downlink Control Information
DL DownLink
DL-SCH Downlink Shared CHannel
DM-RS DeModulated Reference Signal
DRS Dedicated Reference Signal
DSCH Downlink Shared CHannel
DTCH Dedicated Traffic CHannel
E-CID Enhanced Cell IDentification
EPS Evolved Packet System
FACH Forward link Access CHannel
FDD Frequency Division Duplex
FDM Frequency Division Multiplex
FSTD Frequency Switched Transmit Diversity
HARQ Hybrid Automatic Repeat/reQuest
L1 Layer 1 (physical layer)
L2 Layer 2 (data link layer)
L3 Layer 3 (network layer)
LI Length Indicator
LLR Log-Likelihood Ratio
LSB Least Significant Bit
MAC Medium Access Control
MBMS Multimedia Broadcast Multicast Service
MBSFN Multicast Broadcast Single Frequency Network
MCCH MBMS point-to-multipoint Control CHannel
MCH Multicast CHannel
M-PSK M-Phase-Shift Keying
M-QAM M-Quadrature Amplitude Modulation
MRW Move Receiving Window
MSB Most Significant Bit
MSCH MBMS point-to-multipoint Scheduling CHannel
MTCH MBMS point-to-multipoint Traffic CHannel
NAK Non-Acknowledgement
OFDM Orthogonal Frequency Division Multiplexing
PA Power Amplifier
PCCH Paging Control CHannel
PCH Paging CHannel
PCI Physical Cell Identifier
PDCCH Physical Downlink Control CHannel
PCFICH Physical Control Format Indicator CHannel
PDSCH Physical Downlink Shared CHannel
PHICH Physical HARQ Indicator CHannel
PDU Protocol Data Unit
PHY PHYsical layer
PhyCH Physical CHannels
PMI Precoding Matrix Indicator
PRACH Physical Random Access Channel
PRB Physical Resource Block
PSS/SSS Primary/Secondary Synchronization Signals
PUCCH Physical Uplink Control CHannel
PUSCH Physical Uplink Shared CHannel
QPSK Quadrature Phase-Shift Keying
R- Relay
RACH Random Access CHannel
RB Resource Block
RLC Radio Link Control
RRC Radio Resource Control
RE Resource Element
R-PDCCH Relay-Physical Downlink Control Channel
R-PHICH Relay-Physical HARQ Indicator CHannel
RS Reference Signal
RTT Round Trip Time
Rx Receive
SAP Service Access Point
SDU Service Data Unit
SFBC Space Frequency Block Code
SHCCH SHared Control CHannel
SINR Signal-to-Interference-and-Noise Ratio
SN Sequence Number
SR Scheduling Request
SRS Sounding Reference Signal
SU-MIMO Single User Multiple Input Multiple Output
SUFI SUper FIeld
TA Timing Advance
TCH Traffic CHannel
TDD Time Division Duplex
TDM Time Division Multiplex
TFI Transport Format Indicator
TPC Transmit Power Control
TTI Transmission Time Interval
Tx Transmit
U- User-
UE User Equipment
UL UpLink
UM Unacknowledged Mode
UMD Unacknowledged Mode Data
UMTS Universal Mobile Telecommunications System
UTRA UMTS Terrestrial Radio Access
UTRAN UMTS Terrestrial Radio Access Network In accordance with aspects of the disclosure, the systems, apparatus, and methods described herein are configured for allocating downlink (DL) and/or uplink (UL) grants associated with a control channel in a wireless communication system. Various examples presented herein are given for the case of a specific control channel (e.g., Physical Downlink Control Channel (PDCCH), Relay-Physical Downlink Control CHannel (R-PDCCH), etc.). However, it should be appreciated that various aspects described herein may be applied to any suitable control channel. Moreover, it should be appreciated that the claimed subject matter is not intended to be limited to any specific control channel(s) unless stated otherwise.

Figure 6:
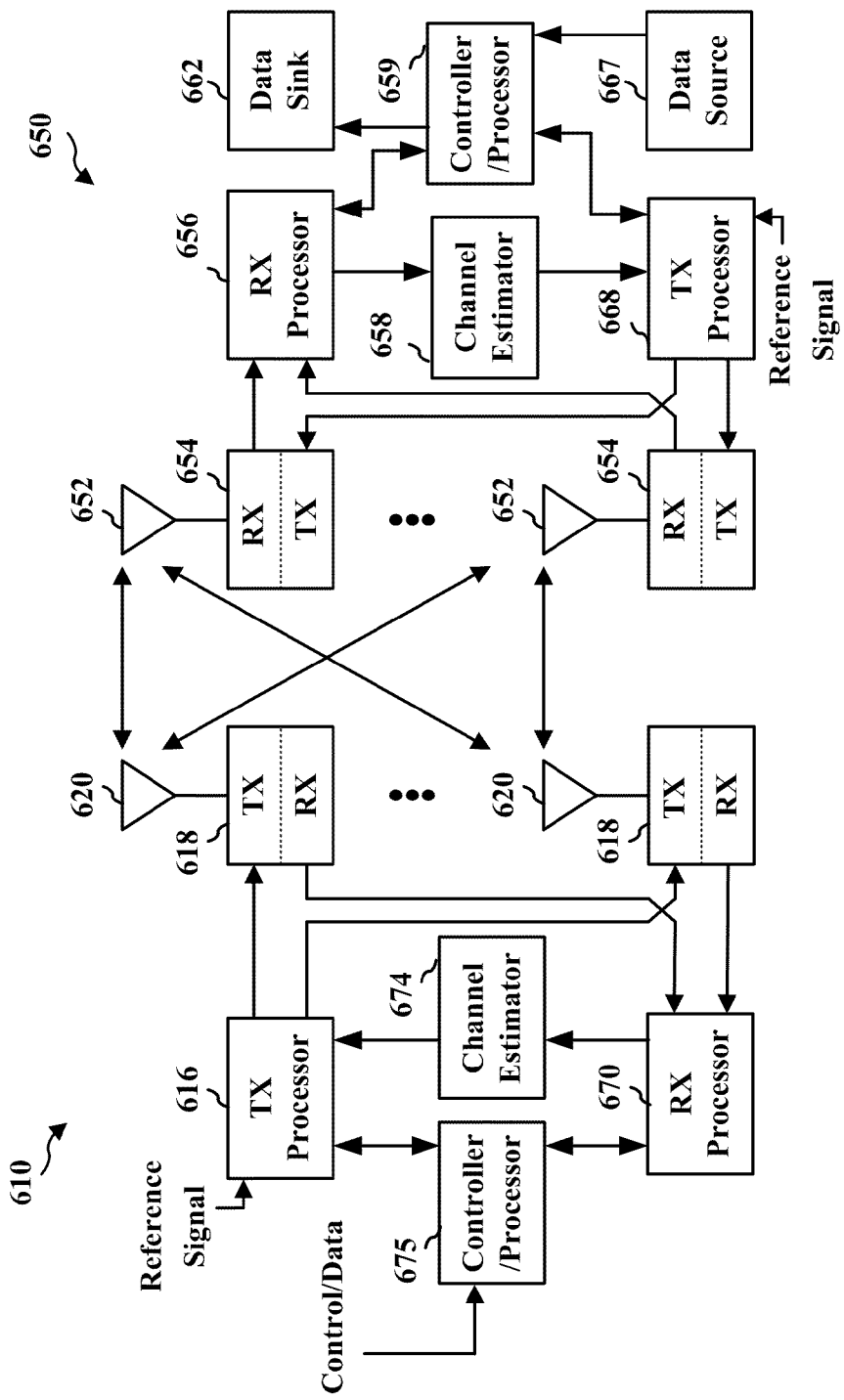

In accordance with an aspect of the disclosure, FIG. 6 is a block diagram of an eNB 610 in communication with a UE 650 in an access network. In the DL, upper layer packets from the core network are provided to a controller/processor 675. The controller/processor 675 implements the functionality of the L2 layer described herein with reference to FIG. 6. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650. In an implementation, a relay device (i.e., relay node (RN)) may be interposed between the eNB 610 and the UE 650 to relay communications therebetween.

The TX processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., Binary Phase-Shift Keying (BPSK), Quadrature Phase-Shift Keying (QPSK), M-Phase-Shift Keying (M-PSK), M-Quadrature Amplitude Modulation (M-QAM)). The coded and modulated symbols are then split into parallel streams. Each stream is then mapped to an OFDM subcarrier, multiplexed with a reference signal (e.g., pilot) in the time and/or frequency domain, and then combined together utilizing an Inverse Fast Fourier Transform (IFFT) to produce a physical channel carrying a time domain OFDM symbol stream. The OFDM stream is spatially precoded to produce multiple spatial streams.

Channel estimates from a channel estimator 674 may be utilized to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission. At the UE 650, each receiver 654RX receives a signal through its respective antenna 652. Each receiver 654RX recovers information modulated onto an RF carrier and provides the information to the receiver (RX) processor 656.

The RX processor 656 is configured to implement various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain utilizing a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to a controller/processor 659.

The controller/processor 659 implements the L2 layer described earlier in connection with FIG. 4C. In the UL, the control/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. In accordance with aspects of the disclosure, the controller/processor 659 is responsible for error detection utilizing a positive acknowledgement (ACK) and/or negative acknowledgement (NAK) protocol to support HARQ operation including, for example, Physical HARQ Indicator CHannel (PHICH) operation.

In the UL, a data source 667 is utilized to provide upper layer packets to the controller/processor 659. The data source 667 represents all protocol layers above the L2 layer (L2). Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be utilized by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 implements the L1 layer.

In one aspect of the disclosure, the controller/processor 659 is configured to implement the L2 layer described herein with reference to FIG. 4C. In the UL, the control/processor 659 provides demultiplexing between transport and logical channels, packet reassembly, deciphering, header decompression, control signal processing to recover upper layer packets from the UE 650. Upper layer packets from the controller/processor 675 may be provided to the core network. The controller/processor 659 is also responsible for error detection utilizing an ACK and/or NAK protocol to support HARQ operations.

In one embodiment of the disclosure, the processing system 114 described in relation to FIG. 1 may include the eNB 610. As such, the processing system 114 may include the TX processor 616, the RX processor 670, and the controller/processor 675.

In another embodiment of the disclosure, the processing system 114 described in relation to FIG. 1 may includes the UE 650. As such, the processing system 114 may include the TX processor 668, the RX processor 656, and the controller/processor 659.

Figure 7A:
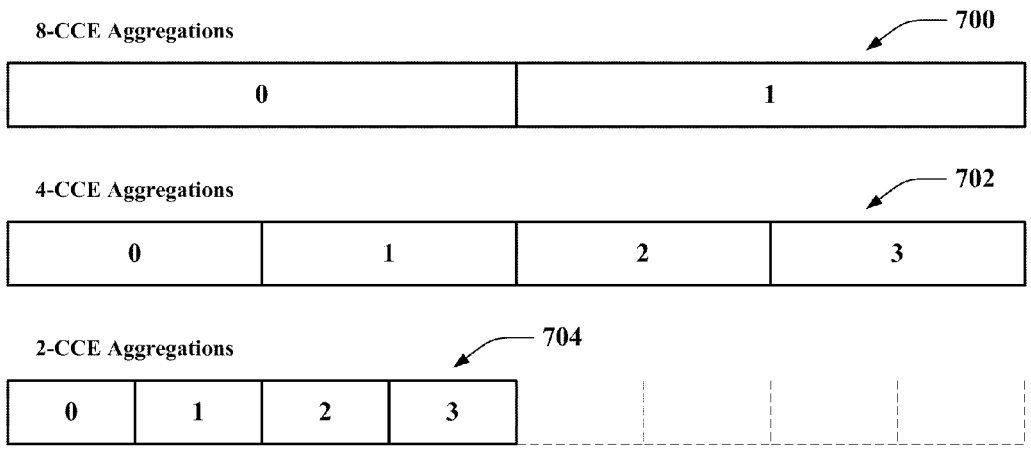
FIGS. 7A and 7B are diagrams illustrating examples of aggregation level configurations related to common search spaces for common control channel resources, in accordance with aspects of the disclosure.

FIG. 7A is a diagram illustrating an example of aggregation level configurations 700, 702, and 704 related to common search spaces for common control channel resources (e.g., PDCCH, Relay-PDCCH, and/or the like), in accordance with aspects of the disclosure. In an example, the common search space may comprise a number of CCEs (e.g., 16 in LTE). The aggregation level configuration 700 comprises 2 candidates, which may each include half of the CCEs in the common search space. In LTE, this may be an aggregation level of 8 such that each candidate includes 8 CCEs of the common search space. The aggregation level configuration 702 comprises 4 candidates and is thus an aggregation level 4 in LTE (e.g., the candidates are half the size as those in aggregation level configuration 700). As described, these two aggregation levels exist in LTE release 8.

In accordance with aspects of the disclosure, the aggregation level configuration 704 may indicate an aggregation level of less than 4 for the common search space (e.g., as shown, an aggregation level of 2, where each candidate is half the size as the aggregation level configuration 702). The aggregation level configuration 704 may be added to the common search space as a contiguous search space and may accordingly be scheduled by an access point to facilitate locating control data at a corresponding access terminal. In another aspect, another aggregation level configuration may indicate an aggregation level of 1 for the common search space (e.g., an aggregation level of less than 2, where each candidate is half the size as the aggregation level configuration 704). As such, an aggregation level of 1 may be defined that includes a plurality of contiguous candidates that comprise 1 CCE each. Smaller aggregation levels, such as the aggregation levels of 1 and 2, may allow more control data to be transmitted over the common control resources. As shown in FIG. 7A, candidate 0 in aggregation level configuration 700 completely overlaps aggregation level configuration 704; thus, in an example, an access point may not schedule an aggregation level according to configuration 704 if it schedules control data in candidate 0 using aggregation level configuration 700 in the same common search space.

Figure 7B:
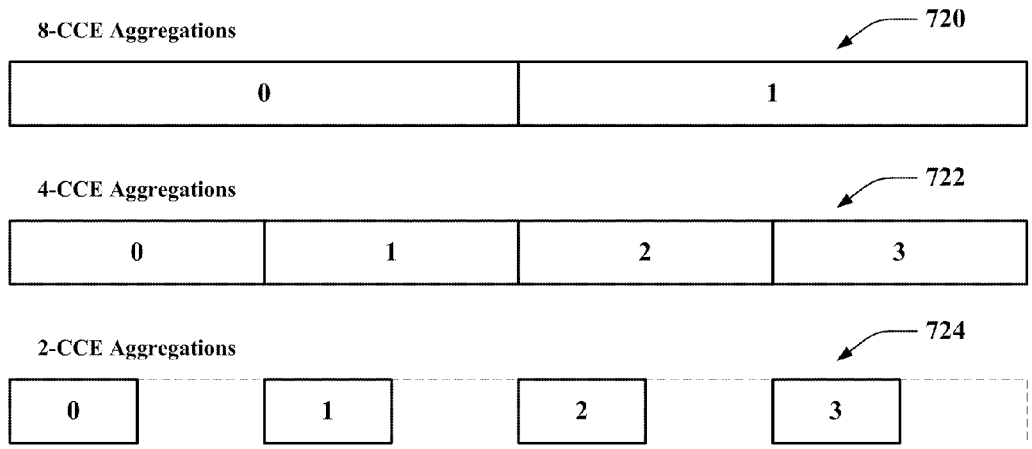

FIG. 7B is a diagram illustrating an example of aggregation level configurations 720, 722, and 724 related to common search spaces for common control channel resources (e.g., PDCCH, Relay-PDCCH, and/or the like), in accordance with aspects of the disclosure. In an example, the common search space may comprise a number of CCEs (e.g., 16 in LTE). The aggregation level configuration 700 comprises 2 candidates, which may each include half of the CCEs in the common search space. In LTE, this may be an aggregation level of 8 such that each candidate includes 8 CCEs of the common search space. The aggregation level configuration 702 comprises 4 candidates and is thus an aggregation level 4 in LTE (e.g., the candidates are half the size as those in aggregation level configuration 700). As described, these two aggregation levels exist in LTE release 8.

In accordance with aspects of the disclosure, the aggregation level configuration 724 may indicate an aggregation level of less than 4 for the common search space (e.g., as shown, an aggregation level of 2, where each candidate is half the size as the aggregation level configuration 722). The aggregation level configuration 724 may be added to the common search space as a non-contiguous search space and may accordingly be scheduled by an access point to facilitate locating control data at a corresponding access terminal. As shown in FIG. 7B, the aggregation level configuration 724 is not completely overlapped by any single candidate in either aggregation level configuration 720, 722. Therefore, the access point may schedule an aggregation level according to the configuration 724 though it may also schedule control data over candidate 0 of an aggregation level according to the configuration 720 in the same common search space. It should be appreciated that the non-contiguous search space defined by the aggregation level configuration 724, though shown as comprising an equal number of CCEs with an equal number of CCEs between, may utilize substantially any configuration of less than 4 contiguous CCEs (such as 2, in this example) for each candidate in the common search space. In another example, an aggregation level of 1 may be defined that includes a plurality of non-contiguous candidates that comprise 1 CCE each.

In accordance with aspects of the disclosure, the configuration 704 of FIG. 7A illustrates 2-CCE aggregation candidates that are consecutive within the common search space, and the configuration 724 of FIG. 7B illustrates 2-CCE aggregation candidates that are non-consecutive within the common search space.

Figure 8A:
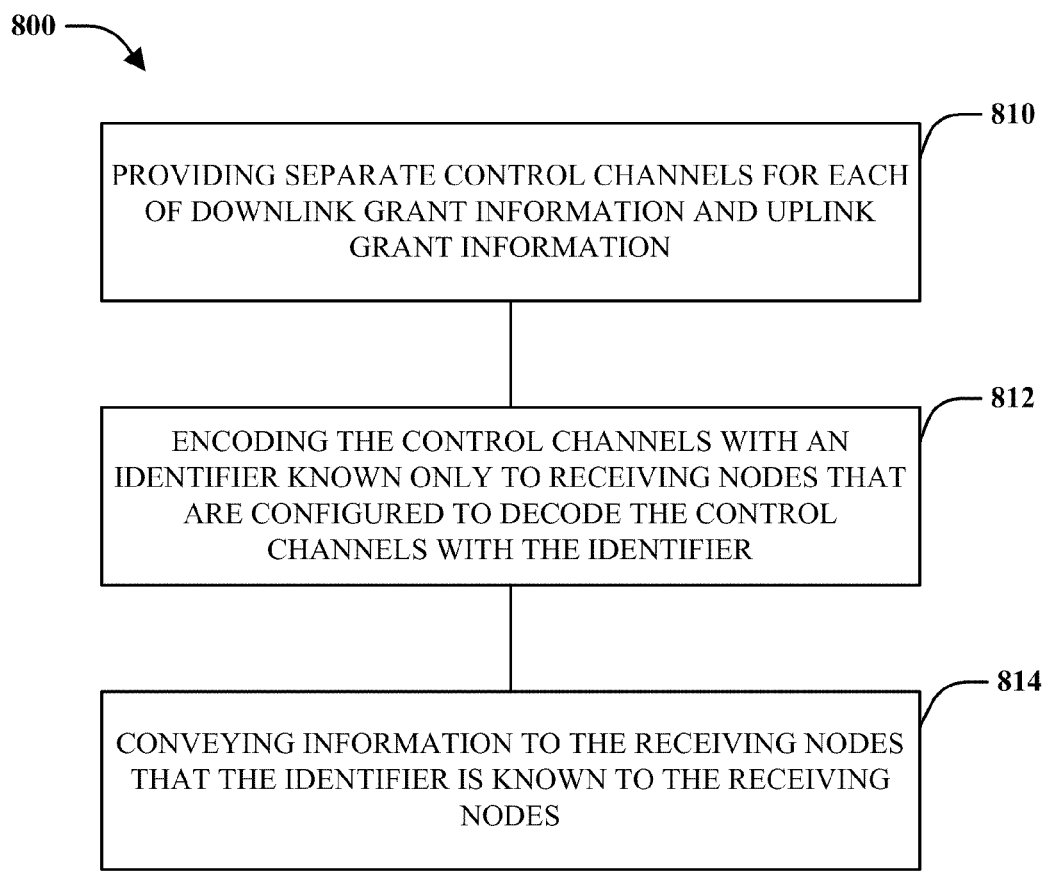
FIGS. 8A, 8B, and 8C are flow diagrams illustrating examples of methods for wireless communication, in accordance with aspects of the disclosure.

FIG. 8A is a flow diagram 800 illustrating a method for wireless communication, in accordance with aspects of the disclosure. At 810, the method is configured for providing separate control channels for each of downlink grant information and uplink grant information. At 812, the method is configured for encoding the control channels with an identifier known only to receiving nodes that are configured to decode the control channels with the identifier. At 814, the method is configured for conveying information to the receiving nodes that the identifier is known to the receiving nodes.

In an implementation, the identifier comprises at least one of a media access control identifier (MAC ID) and a radio network temporary identifier (RNTI).

In an implementation, the method may further comprise spanning the control channels over multiple resource blocks and conveying span information of the control channels to the receiving nodes. The method may further comprise interleaving the control channels over multiple resource blocks and conveying interleave information of the control channels to the receiving nodes. In an example, interleaving the control channel for the downlink grant information may be related to interleaving the control channel for the uplink grant information.

In an implementation, the method may further comprise separately interleaving each control channel over a different span of resource blocks and conveying interleave information of the control channels to the receiving nodes including information related to the separate interleaving for each different span of resource blocks so that the receiving nodes are able to blindly determine the span via hypothesis testing for one or more span configurations of the control channels. The method may further comprise aggregating multiple resource blocks for each control channel and conveying aggregate information of the control channels to the receiving nodes.

In an implementation, the method may further comprise mapping the downlink grant information and the uplink grant information in a selected order. The downlink and uplink grant information may be mapped to separate resource blocks. If resource space is available in a resource block for the downlink grant information, then the uplink grant information may be mapped to the available resource space in the resource block for the downlink grant information after a resource space for the uplink grant information is utilized.

In an implementation, the downlink grant information is transmitted in a first slot of a subframe, and the uplink grant information is transmitted in a second slot of the subframe. The downlink grant information may be transmitted in a first physical resource block of a physical resource block pair, and the uplink grant information may be transmitted in a second physical resource block of the physical resource block pair.

Figure 8B:
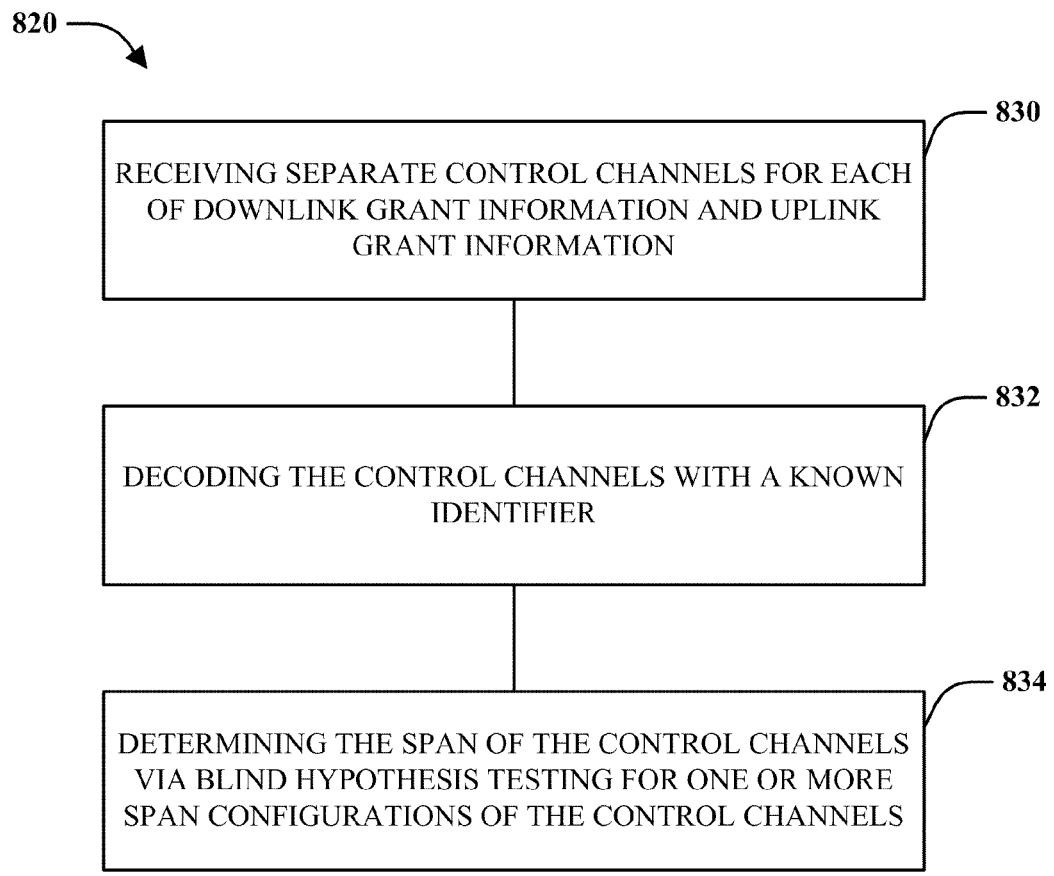

FIG. 8B is a flow diagram 820 illustrating a method for wireless communication, in accordance with aspects of the disclosure. At 830, the method is configured for receiving separate control channels for each of downlink grant information and uplink grant information. At 832, the method is configured for decoding the control channels with a known identifier. At 834, the method is configured for determining the span of the control channels via blind hypothesis testing for one or more span configurations of the control channels.

In an implementation, the identifier comprises at least one of a media access control identifier (MAC ID) and a radio network temporary identifier (RNTI). The span of the control channels may be determined to span over multiple resource blocks.

In an implementation, the method may further comprise determining an interleaving of the control channels over multiple resource blocks. In an example, the interleaving of the control channel for the downlink grant information may be related to interleaving of the control channel for the uplink grant information. The method may further comprise determining a separate interleaving for each control channel over a different span of resource blocks. The method may further comprise determining an aggregating of multiple resource blocks for each control channel.

In an implementation, the method may further comprise determining mapping of the downlink grant information and the uplink grant information in a selected order. The downlink and uplink grant information may be mapped to separate resource blocks. If resource space is available in a resource block for the downlink grant information, then the uplink grant information may be mapped to the available resource space in the resource block for the downlink grant information after a resource space for the uplink grant information is utilized.

In an implementation, the downlink grant information may be received in a first slot of a subframe, and the uplink grant information may be received in a second slot of the subframe. The downlink grant information may be received in a first physical resource block of a physical resource block pair, and the uplink grant information may be received in a second physical resource block of the physical resource block pair.

Figure 8C:
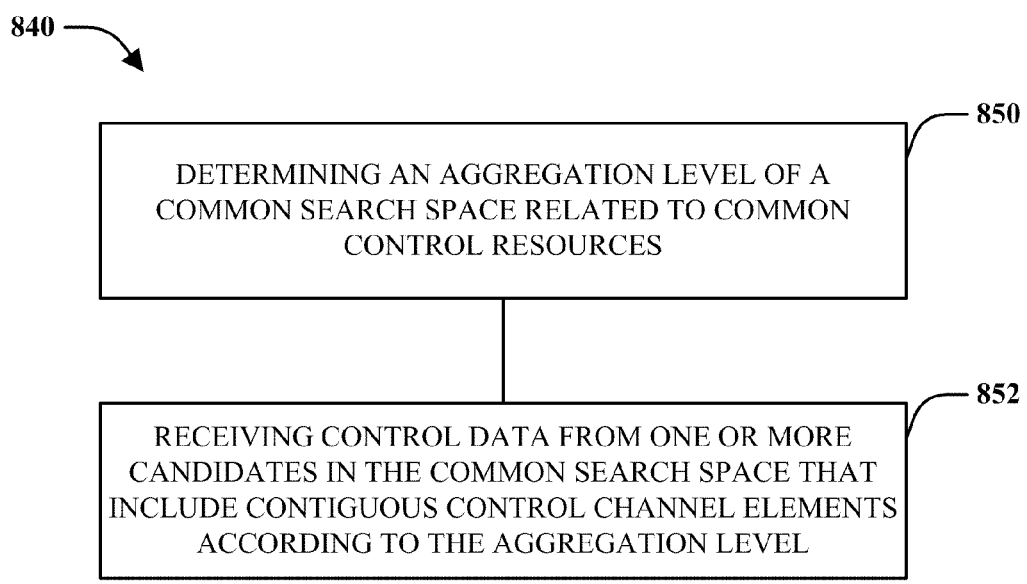

FIG. 8C is a flow diagram 840 illustrating a method for wireless communication, in accordance with aspects of the disclosure. At 850, the method is configured for determining an aggregation level of a common search space related to common control resources, wherein the aggregation level is less than four. At 852, the method is configured for receiving control data from one or more candidates in the common search space that include contiguous control channel elements according to the aggregation level.

In an implementation, the candidates are consecutive within the common search space, or the candidates are non-consecutive within the common search space. The common search space comprises an upper bound of sixteen control channel elements.

In an implementation, the method further comprises selecting the aggregation level for communicating control data to a wireless device over common control resources, wherein the aggregation level is less than four, and transmitting control data to the wireless device in one or more candidates that include the contiguous control channel elements in the common search space according to the aggregation level.

Figure 9A:
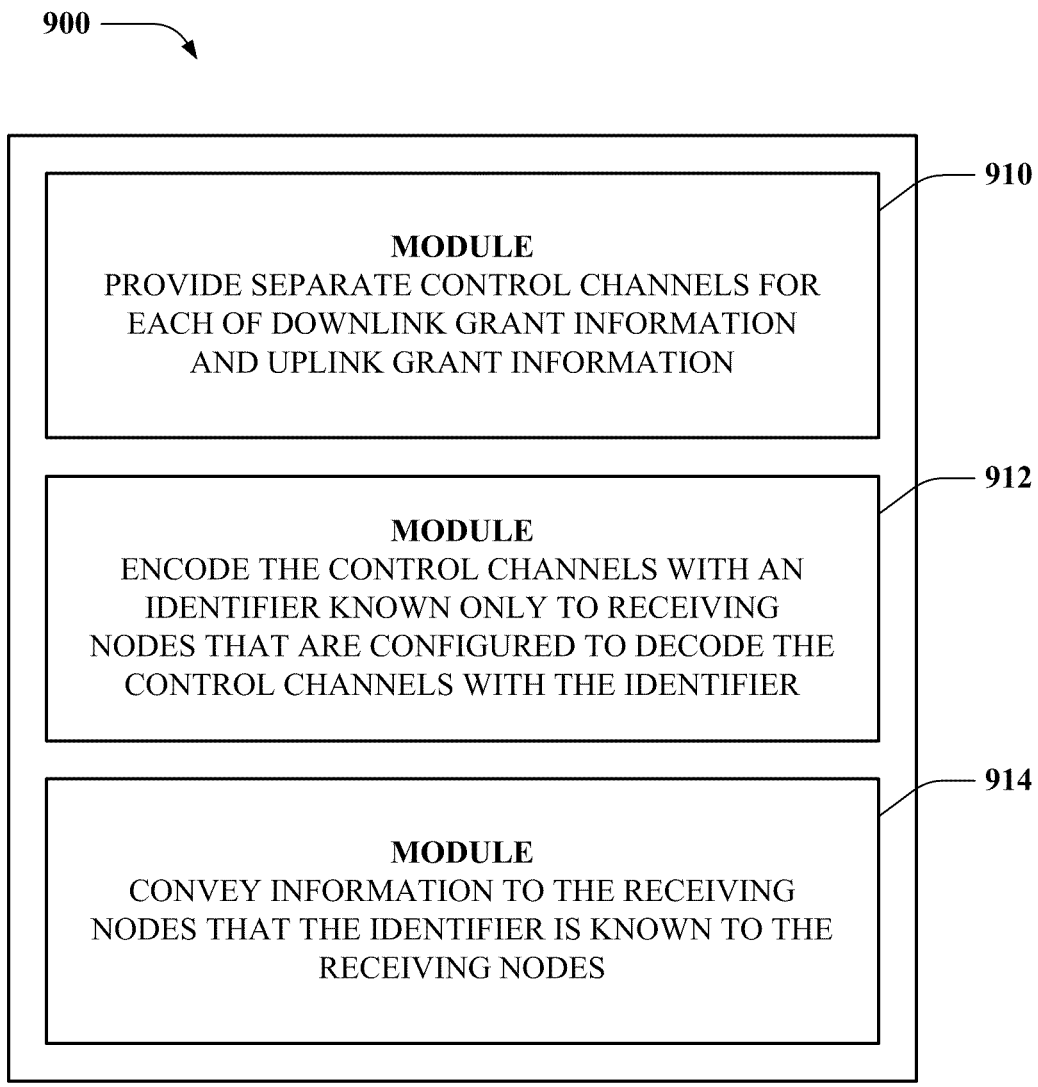
FIGS. 9A, 9B, and 9C are block diagrams illustrating functionality of an apparatus configured for wireless communication, in accordance with aspects of the disclosure.

FIG. 9A is a block diagram 900 illustrating functionality of an apparatus, such as, for example, the apparatus 100 of FIG. 1A and/or the apparatus 140 of FIG. 1B, configured for wireless communication, in accordance with aspects of the disclosure. The apparatus 100, 140 comprises a module 910 configured to provide separate control channels for each of downlink grant information and uplink grant information. The apparatus 100, 140 comprises a module 912 configured to encode the control channels with an identifier known only to receiving nodes that are configured to decode the control channels with the identifier. The apparatus 100, 140 comprises a module 914 configured to convey information to the receiving nodes that the identifier is known to the receiving nodes. The apparatus 100, 140 may include additional modules that perform each of the steps in the aforementioned flow charts. As such, each step in the aforementioned flow charts may be performed by a module, and the apparatus 100, 140 may include one or more of those modules. In an implementation, the known identifier comprises at least one of a media access control identifier (MAC ID) and a radio network temporary identifier (RNTI).

Figure 9B:
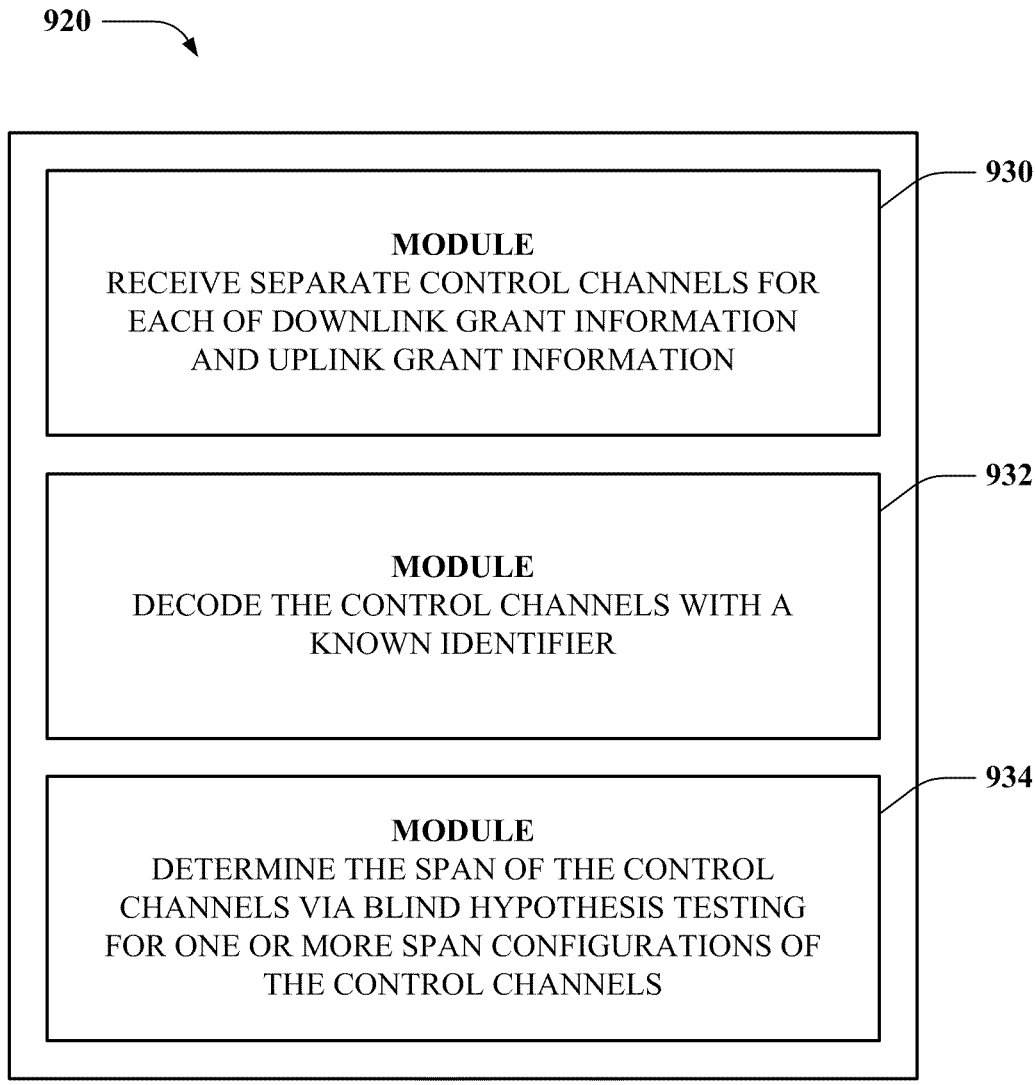

FIG. 9B is a block diagram 920 illustrating functionality of an apparatus, such as, for example, the apparatus 100 of FIG. 1A and/or the apparatus 140 of FIG. 1B, configured for wireless communication, in accordance with aspects of the disclosure. The apparatus 100, 140 comprises a module 930 configured to receive separate control channels for each of downlink grant information and uplink grant information. The apparatus 100, 140 comprises a module 932 configured to decode the control channels with a known identifier. The apparatus 100, 140 comprises a module 934 configured to determine the span of the control channels via blind hypothesis testing for one or more span configurations of the control channels. The apparatus 100, 140 may include additional modules that perform each of the steps in the aforementioned flow charts. As such, each step in the aforementioned flow charts may be performed by a module, and the apparatus 100, 140 may include one or more of those modules. In an implementation, the known identifier comprises at least one of a media access control identifier (MAC ID) and a radio network temporary identifier (RNTI).

Figure 9C:
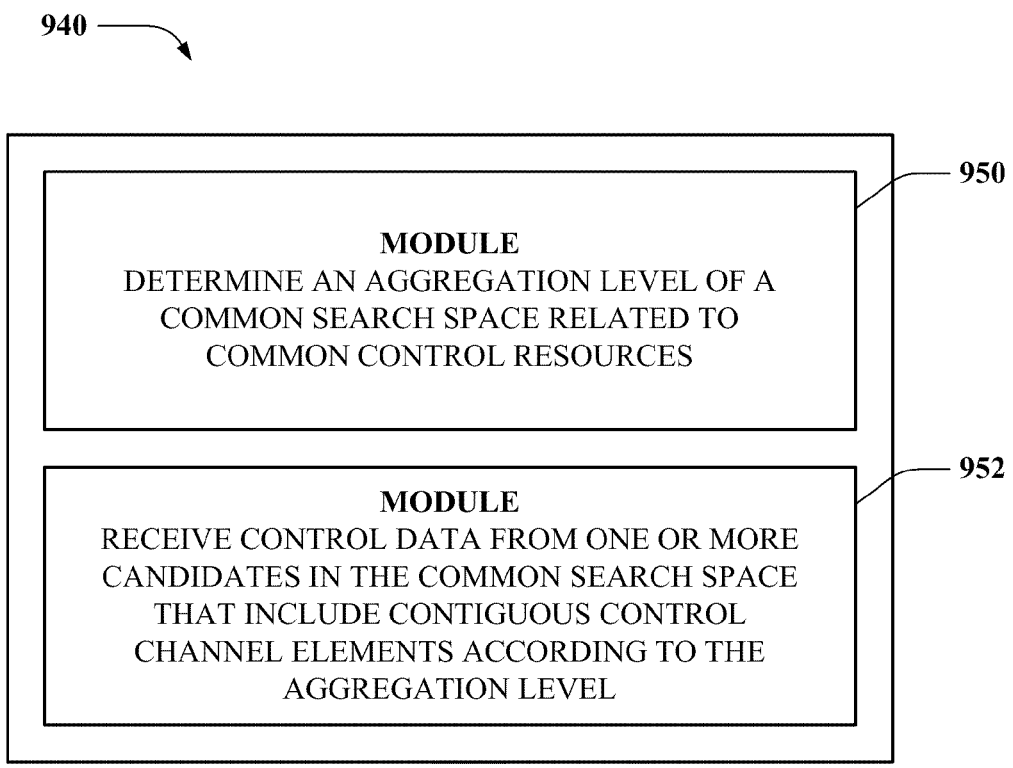

FIG. 9C is a block diagram 940 illustrating functionality of an apparatus, such as, for example, the apparatus 100 of FIG. 1A and/or the apparatus 140 of FIG. 1B, configured for wireless communication, in accordance with aspects of the disclosure. The apparatus 100, 140 comprises a module 950 configured to determine an aggregation level of a common search space related to common control resources. In an implementation, the aggregation level is less than four. The apparatus 100, 140 comprises a module 952 configured to receive control data from one or more candidates in the common search space that include contiguous control channel elements according to the aggregation level. The apparatus 100, 140 may include additional modules that perform each of the steps in the aforementioned flow charts. As such, each step in the aforementioned flow charts may be performed by a module, and the apparatus 100, 140 may include one or more of those modules.

Referring to FIG. 1A, in a configuration, the apparatus 100 for wireless communication comprises the processing system 114 configured to provide a means for providing separate control channels for each of downlink grant information and uplink grant information, a means for encoding the control channels with an identifier known only to receiving nodes that are configured to decode the control channels with the identifier, and a means for conveying information to the receiving nodes that the identifier is known to the receiving nodes.

Referring to FIG. 1B, in a configuration, the apparatus 140 for wireless communication comprises the processing system 150 configured to provide a means for providing separate control channels for each of downlink grant information and uplink grant information, a means for encoding the control channels with an identifier known only to receiving nodes that are configured to decode the control channels with the identifier, and a means for conveying information to the receiving nodes that the identifier is known to the receiving nodes.

Referring to FIG. 1A, in a configuration, the apparatus 100 for wireless communication comprises the processing system 114 configured to provide a means for receiving separate control channels for each of downlink grant information and uplink grant information, a means for decoding the control channels with a known identifier, and a means for determining the span of the control channels via blind hypothesis testing for one or more span configurations of the control channels.

Referring to FIG. 1B, in a configuration, the apparatus 140 for wireless communication comprises the processing system 150 configured to provide a means for receiving separate control channels for each of downlink grant information and uplink grant information, a means for decoding the control channels with a known identifier, and a means for determining the span of the control channels via blind hypothesis testing for one or more span configurations of the control channels.

Referring to FIG. 1A, in a configuration, the apparatus 100 for wireless communication comprises the processing system 114 configured to provide a means for determining an aggregation level of a common search space related to common control resources, wherein the aggregation level is less than four, and a means for receiving control data from one or more candidates in the common search space that include contiguous control channel elements according to the aggregation level.

Referring to FIG. 1B, in a configuration, the apparatus 140 for wireless communication comprises the processing system 150 configured to provide a means for determining an aggregation level of a common search space related to common control resources, wherein the aggregation level is less than four, and a means for receiving control data from one or more candidates in the common search space that include contiguous control channel elements according to the aggregation level.

It will be appreciated that, in accordance with one or more aspects described herein, inferences may be made regarding or for performing the functions described herein. As utilized herein, the term to "infer" or "inference" refers generally to the process of reasoning about or inferring states of the system, environment, and/or user from a set of observations as captured via events and/or data. Inference may be employed to identify a specific context or action, or may generate a probability distribution over states, for example. The inference may be probabilistic—that is, the computation of a probability distribution over states of interest based on a consideration of data and events. Inference may also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented utilizing any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor may read information from, and write information to, the storage medium. In the alternative, the storage medium may be integral to the processor. The processor and the storage medium may reside in an ASIC. The ASIC may reside in a UE. In the alternative, the processor and the storage medium may reside as discrete components in a UE.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited utilizing the phrase "means for" or, in the case of a method claim, the element is recited utilizing the phrase "step for."

What is claimed is:

1. A method of wireless communication, the method comprising:
   allocating a first physical resource region for transmitting downlink grant information in a data region of a subframe, wherein the first physical resource region spans a first number of resource blocks in the subframe;
   encoding a first control channel for the downlink grant information; and interleaving the first control channel within the first physical resource region by a first interleaver corresponding to the first number of resource blocks, wherein the first number of resource blocks of the first physical resource region is determined by a user equipment (UE) through blind decoding with respect to multiple interleaver-candidates, each of the multiple interleaver-candidates corresponding to a different number of the resource blocks;

allocating a second physical resource region for transmitting uplink grant information in the data region of the subframe, wherein the second physical resource region is disjoint from the first physical resource region; encoding a second control channel for the uplink grant information; and interleaving the second control channel within the second physical resource region by a second interleaver;

wherein the second interleaver is a shifted version of the first interleaver.

2. The method of claim 1, wherein the first physical resource region and the second physical resource region are in different slots of the subframe.

3. A base station for wireless communication, comprising:
a memory; and
at least one processor coupled to the memory and configured to:
allocate a first physical resource region for transmitting downlink grant information in a data region of a subframe, wherein the first physical resource region spans a first number of resource blocks in the subframe;
encode a first control channel for the downlink grant information; and
interleave the first control channel within the first physical resource region by a first interleaver corresponding to the first number of resource blocks, wherein the first number of resource blocks of the first physical resource region is determined by a user equipment (UE) through blind decoding with respect to multiple interleaver-candidates, each of the multiple interleaver-candidates corresponding to a different number of the resource blocks;
allocating a second physical resource region for transmitting uplink grant information in the data region of the subframe, wherein the second physical resource region is disjoint from the first physical resource region; encoding a second control channel for the uplink grant information; and
interleaving the second control channel within the second physical resource region by a second interleaver;
wherein the second interleaver is a shifted version of the first interleaver.

4. The base station of claim 3, wherein the at least one processor is further configured to:
allocate a second physical resource region for transmitting uplink grant information in the data region of the subframe, wherein the second region is disjoint from the first physical resource region;
encode a second control channel for the uplink grant information; and
interleave the second control channel within the second region by a second interleaver.

5. An apparatus for wireless communication comprising:
means for allocating a first physical resource region for transmitting downlink grant information in a data region of a subframe, wherein the first physical resource region spans a first number of resource blocks in the subframe;
means for encoding a first control channel for the downlink grant information; and
means for interleaving the first control channel within the first physical resource region by a first interleaver corresponding to the first number of resource blocks, wherein the first number of resource blocks of the first physical resource region is determined by a user equipment (UE) through blind decoding with respect to multiple interleaver-candidates, each of the multiple interleaver-candidates corresponding to a different number of the resource blocks;
allocating a second physical resource region for transmitting uplink grant information in the data region of the subframe, wherein the second physical resource region is disjoint from the first physical resource region; encoding a second control channel for the uplink grant information; and
interleaving the second control channel within the second physical resource region by a second interleaver;
wherein the second interleaver is a shifted version of the first interleaver.

6. A non-transitory computer-readable medium storing computer executable code
for wireless communication, comprising code for:
allocating a first physical resource region for transmitting downlink grant information in a data region of a subframe, wherein the first physical resource region spans a first number of resource blocks in the subframe;
encoding a first control channel for the downlink grant information; and
interleaving the first control channel within the first physical resource region by a first interleaver corresponding to the first number of resource blocks, wherein the first number of resource blocks of the first physical resource region is determined by a user equipment (UE) through blind decoding with respect to multiple interleaver-candidates, each of the multiple interleaver-candidates corresponding to a different number of the resource blocks;
allocating a second physical resource region for transmitting uplink grant information in the data region of the subframe, wherein the second physical resource region is disjoint from the first physical resource region; encoding a second control channel for the uplink grant information; and
interleaving the second control channel within the second physical resource region by a second interleaver;
wherein the second interleaver is a shifted version of the first interleaver.

* * * * *